US012118746B2

(12) United States Patent
Niday et al.

(10) Patent No.: US 12,118,746 B2
(45) Date of Patent: Oct. 15, 2024

(54) CALIBRATION OF AUTONOMOUS FARMING VEHICLE IMAGE ACQUISITION SYSTEM

(71) Applicant: Blue River Technology Inc., Sunnyvale, CA (US)

(72) Inventors: Tyler Calvin Niday, Santa Cruz, CA (US); Ugur Oezdemir, Saratoga, CA (US)

(73) Assignee: BLUE RIVER TECHNOLOGY INC., Santa Clara, CA (US)

( * ) Notice: Subject to any disclaimer, the term of this patent is extended or adjusted under 35 U.S.C. 154(b) by 281 days.

(21) Appl. No.: 17/483,762

(22) Filed: Sep. 23, 2021

(65) Prior Publication Data

US 2022/0101557 A1 Mar. 31, 2022

Related U.S. Application Data

(60) Provisional application No. 63/084,751, filed on Sep. 29, 2020.

(51) Int. Cl.
| | |
|---|---|
| *G06T 7/80* | (2017.01) |
| *G06T 7/579* | (2017.01) |
| *G06T 7/70* | (2017.01) |
| *G06T 17/05* | (2011.01) |
| *G06V 20/58* | (2022.01) |
| *G06V 20/64* | (2022.01) |

(52) U.S. Cl.
CPC ............... *G06T 7/80* (2017.01); *G06T 7/579* (2017.01); *G06T 7/70* (2017.01); *G06T 17/05* (2013.01); *G06V 20/58* (2022.01); *G06V 20/647* (2022.01)

(58) Field of Classification Search
None
See application file for complete search history.

(56) References Cited

U.S. PATENT DOCUMENTS

| | | | |
|---|---|---|---|
| 9,201,424 B1* | 12/2015 | Ogale | ................... G06T 7/80 |
| 10,436,885 B2* | 10/2019 | Wheeler | ............ G01C 21/1652 |
| 10,713,484 B2 | 7/2020 | Polzounov et al. | |
| 2019/0090408 A1* | 3/2019 | Redden | .................. G01C 11/06 |

(Continued)

OTHER PUBLICATIONS

Heng et al., "Leveraging Image-based Localization for Infrastructure-based Calibration of a Multi-camera Rig," 2015, J. Field Robotics, vol. 32, pp. 775-802 (Year: 2015).*

(Continued)

*Primary Examiner* — Vincent Rudolph
*Assistant Examiner* — Nicholas Crespo Stazer
(74) *Attorney, Agent, or Firm* — Fenwick & West LLP

(57) ABSTRACT

A system and a method are disclosed for calibrating an image acquisition system of a farming machine. The farming machine captures images of objects in an environment as the farming machine moves through an environment. Based on the captured images, a represented three-dimensional (3D) model of the environment representing the objects in a three-dimensional space is generated. From the represented 3D model, a represented location of an object (e.g., building, lamppost, tree) is determined. The represented location of the object is compared to a reference location of the object and the comparison is used to calibrate the image acquisition system by modifying positions, orientations, or optical settings of one or more cameras in the image acquisition system.

16 Claims, 15 Drawing Sheets

(56) References Cited

U.S. PATENT DOCUMENTS

| | | |
|---|---|---|
| 2019/0364206 A1 | 11/2019 | Mutto et al. |
| 2020/0007847 A1 | 1/2020 | Redden |
| 2020/0082180 A1* | 3/2020 | Wang ........................ G06T 7/80 |
| 2020/0125863 A1* | 4/2020 | Shashua ................. G06V 20/56 |
| 2020/0363202 A1* | 11/2020 | Metzler .................... G06T 7/80 |

OTHER PUBLICATIONS

PCT International Search Report and Written Opinion, PCT Application No. PCT Application No. PCT/US2021/051823, Jan. 5, 2022, 15 pages.

\* cited by examiner

Farming Machine 100d

CALIBRATION OF AUTONOMOUS FARMING VEHICLE IMAGE ACQUISITION SYSTEM

CROSS REFERENCE TO RELATED APPLICATIONS

This application claims the benefit of U.S. Provisional Application No. 63/084,751 filed Sep. 29, 2020, which is incorporated in its entirety herein by this reference.

BACKGROUND

Field of Disclosure

This disclosure generally relates to farming technology, in particular to calibrating an image acquisition system of a farming machine.

Description of the Related Art

Conventional farming machines for performing farming operations such as plowing, tilling, planting, and treating plants may be equipped with sensors to gather data about conditions of its environment. Using the data, the farming machines autonomously or semi-autonomously determines instructions for traversing through the field while performing the farming operations. In particular, the sensors of the farming machines may include an image acquisition system that includes one or more cameras used to capture images of the environment, and the farming machines may use visual information in the images to generate the instructions for performing the farming operations.

Because the farming machines rely on images to generate instructions for performing the farming operations, it is necessary to gather accurate image data using a properly calibrated imaging system. For example, if the farming machines are configured to treat individual plants in the field instead of widely applying the treatment throughout the field, it is important to have accurate images to identify the individual plants and determine a location of the individual plants. In another example, the farming machines may be configured to till the field and to prepare the ground for planting. The farming machines may rely on the image acquisition system to determine how to navigate through the field and which regions of the field to till. Thus, to perform the farming operations accurately, the farming machines requires precise calibration of the image acquisition system to make an accurate interpretation of the images. However, because farming machines are deployed in a variety of environments with different conditions, layouts, sizes, and because farming machines are used for different types of farming operations, it is difficult to implement a comprehensive calibration standard across all image acquisition systems for the farming machines. Further, variances in characteristics of cameras installed on different farming machines and placement of the cameras add to calibration difficulties.

SUMMARY

A farming machine including an image acquisition system performs real-time calibration of the image acquisition system. The image acquisition system includes one or more cameras that captures images of a field as the farming machine travels through the field. Based on the captured images, a control system of the farming machine runs image segmentation or other detection methods to generate labelled images by identifying objects in the field and semantically labelling the identified objects and/or identifying pixel locations or boundary box corresponding to the identified objects. The objects may include static objects with known locations such as a building, lamppost, sign, or tree. The control system uses the labelled images in combination with motion data from an inertial measurement unit (IMU) and location data from a global positioning system (GPS) receiver to generate a three-dimensional (3D) model representative of the field ("represented 3D model") in real time (for instance, using SLAM). Using the represented 3D model, the control system determines locations of one or more of the identified objects within the 3D model ("represented locations"). The control system compares the represented locations of the one or more identified objects to known reference locations of the one or more identified objects. A represented location and/or a reference location associated with an identified object may be represented by a six dimensional vector including three dimensional location coordinates and three dimensional rotational data.

The reference locations may be determined from a reference 3D model generated based on previous images captured by the image acquisition system (e.g., during previous passes through the field). Alternatively, the reference locations may be determined from a reference 3D model generated based on images captured by one or more different cameras from the one or more cameras that captured the image used to generate the represented 3D model. The one or more cameras used for the represented 3D model may have narrower field of view compared to the one or more cameras used for the reference 3D model. In an embodiment, the images used to generate the represented 3D model and the images used to generate the reference 3D model are captured simultaneously. Based on a comparison of the represented locations to the reference locations, the farming machine determines when the one or more cameras in the image acquisition system are misaligned or faulty. The control system may calibrate the image acquisition system by performing digital adjustments on images captured by the image acquisition system or by physically modifying positions, orientations, or optical settings of the one or more cameras in the image acquisition system.

Figure 1A:
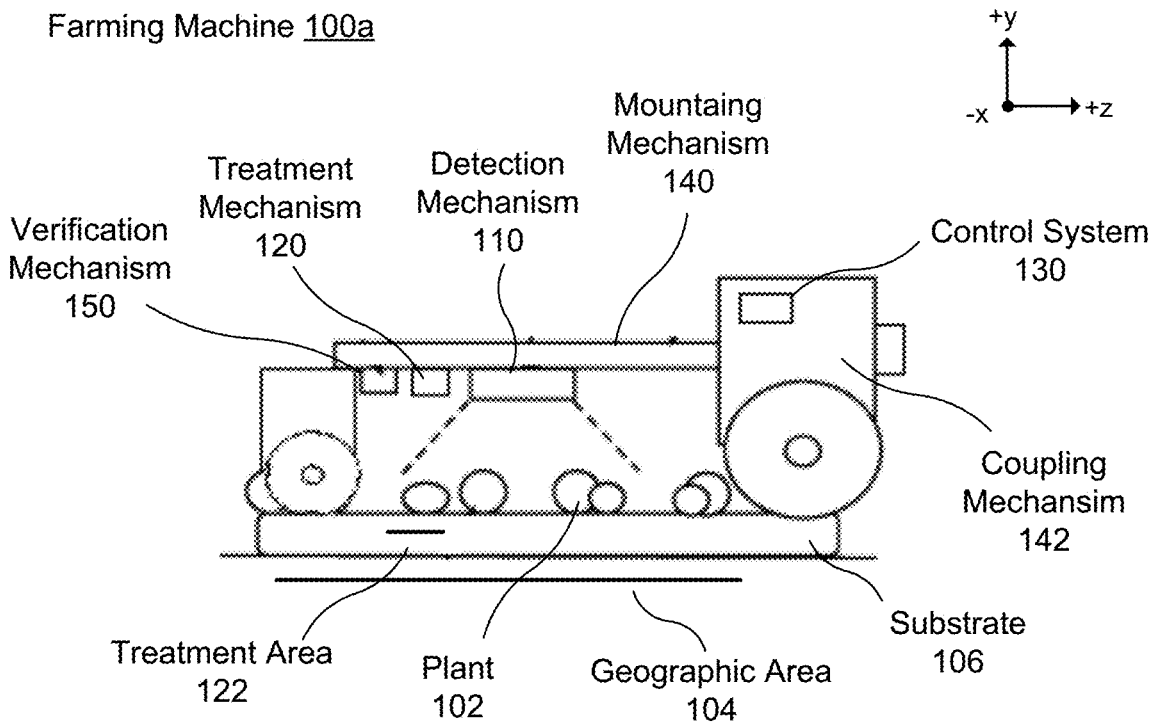
FIG. 1A illustrates a side view of a farming machine, in accordance with an embodiment.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

I. Introduction

A farming machine includes an automated or semi-automated system for performing farming operations. A farming operation performed by the farming machine may be identifying and treating plants in a field. The farming machine employs an image acquisition system to detect plants for treatment as the farming machine travels through the field. The image acquisition system includes a plurality of image sensors (e.g., cameras) physically coupled to the farming machine to capture images of one or more plants. A control system identifies plants in the images and actuates treatment mechanisms coupled to the farming machine to treat the identified plants based on the images. As such, the farming machine is configured to target and treat plants individually, thus reducing waste and preventing unwanted plant growth resulting from treatments that are applied liberally across a field. Another farming operation performed by the farming machine may be tilling the field in preparation of planting. Using an automated system also reduces manual labor and costs, improving farming efficiency.

Prior to using the farming machine for performing the farming operations, the farming machine may be initialized by calibrating the image acquisition system. During calibration, an operator may be instructed to drive the farming machine through the field and capture image of the field using the image acquisition system. Image segmentation methods can be applied to the images to identify objects located within the field. The farming machine includes one or more inertial measurement units (IMU) configured to collect motion data and a global positioning system (GPS) receiver configured to collect location data, and the IMU and GPS receiver are synchronized with the image acquisition system. When image data captured by the image acquisition system is combined with motion data collected by the IMU and location data of the GPS receiver, the farming machine can generate a represented 3-dimensional model used to determine represented locations of the identified objects in the images. For example, the captured images may include a lamppost, and the farming machine determines the represented location of the lamppost based on pixel locations associated with the lamppost in the captured images, motion data, and location data. The farming machine compares the represented locations of the objects to reference locations associated with the objects. Reference locations serve as benchmarks for the represented locations, and a comparison of the represented locations and the reference locations is used to determine characteristics of the cameras of the image acquisition system. Based on the comparison, the farming machine adjusts the image acquisition system. For example, the farming machine may change robotic transformation values, digitally modify captured images, modify optical elements or position of the cameras such that the represented locations are aligned with the reference locations.

II. Plant Treatment System

Figure 1B:
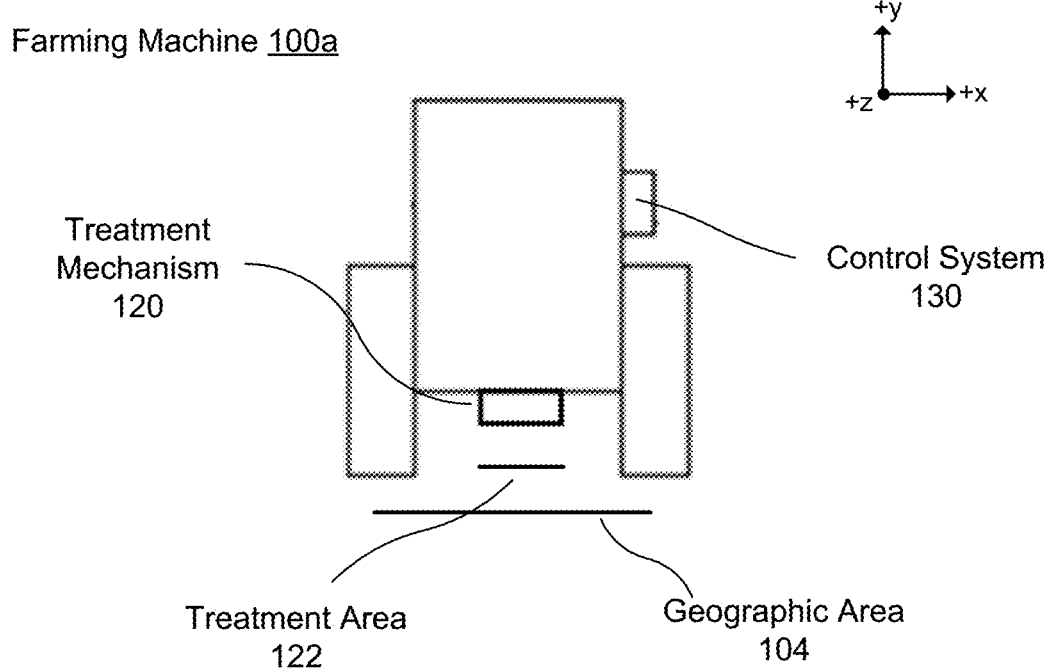
FIG. 1B illustrates a front view of a farming machine, in accordance with an embodiment.
Figure 1C:
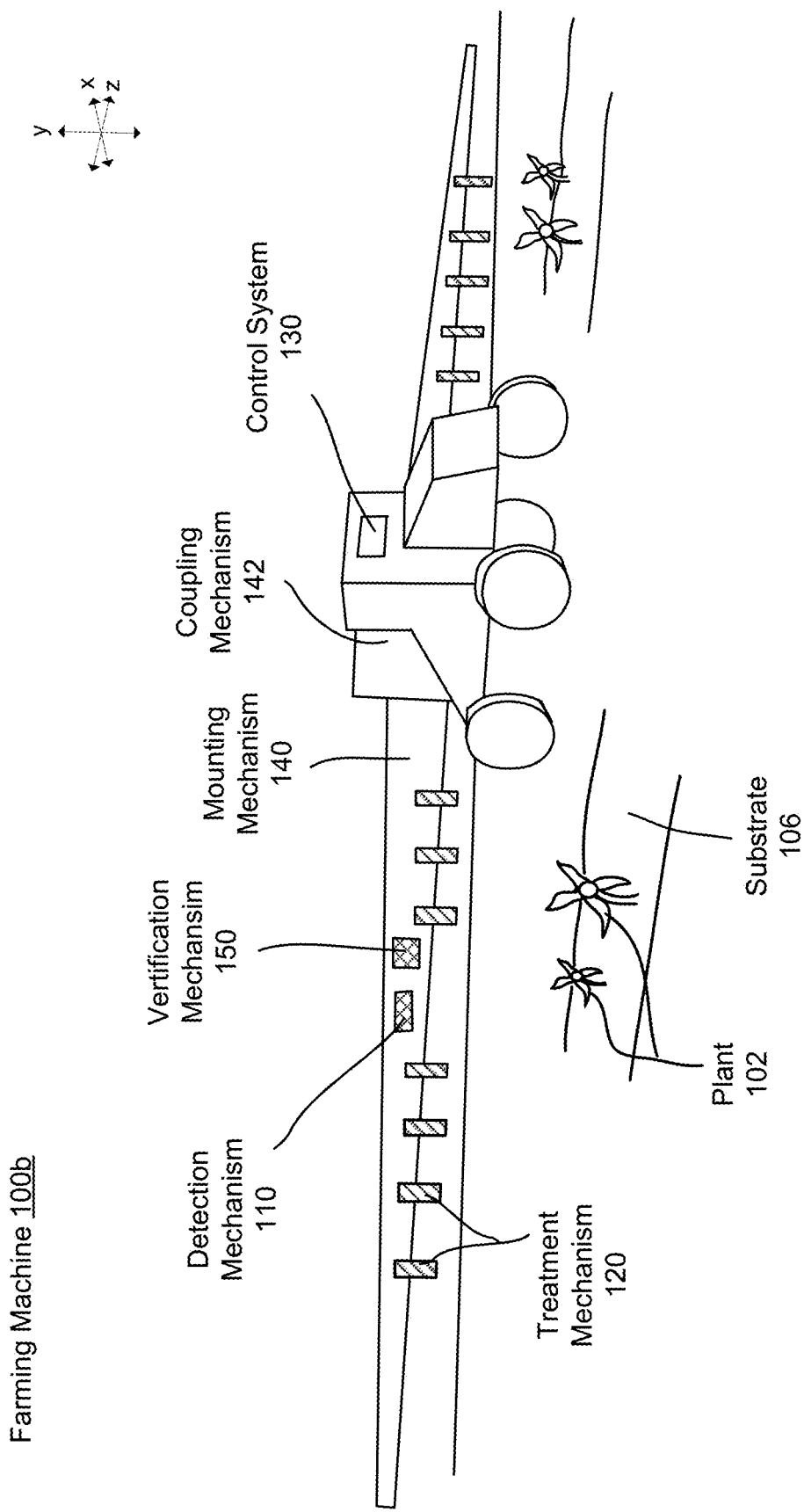
FIG. 1C illustrates an isometric view of a farming machine, in accordance with an embodiment.
Figure 1D:
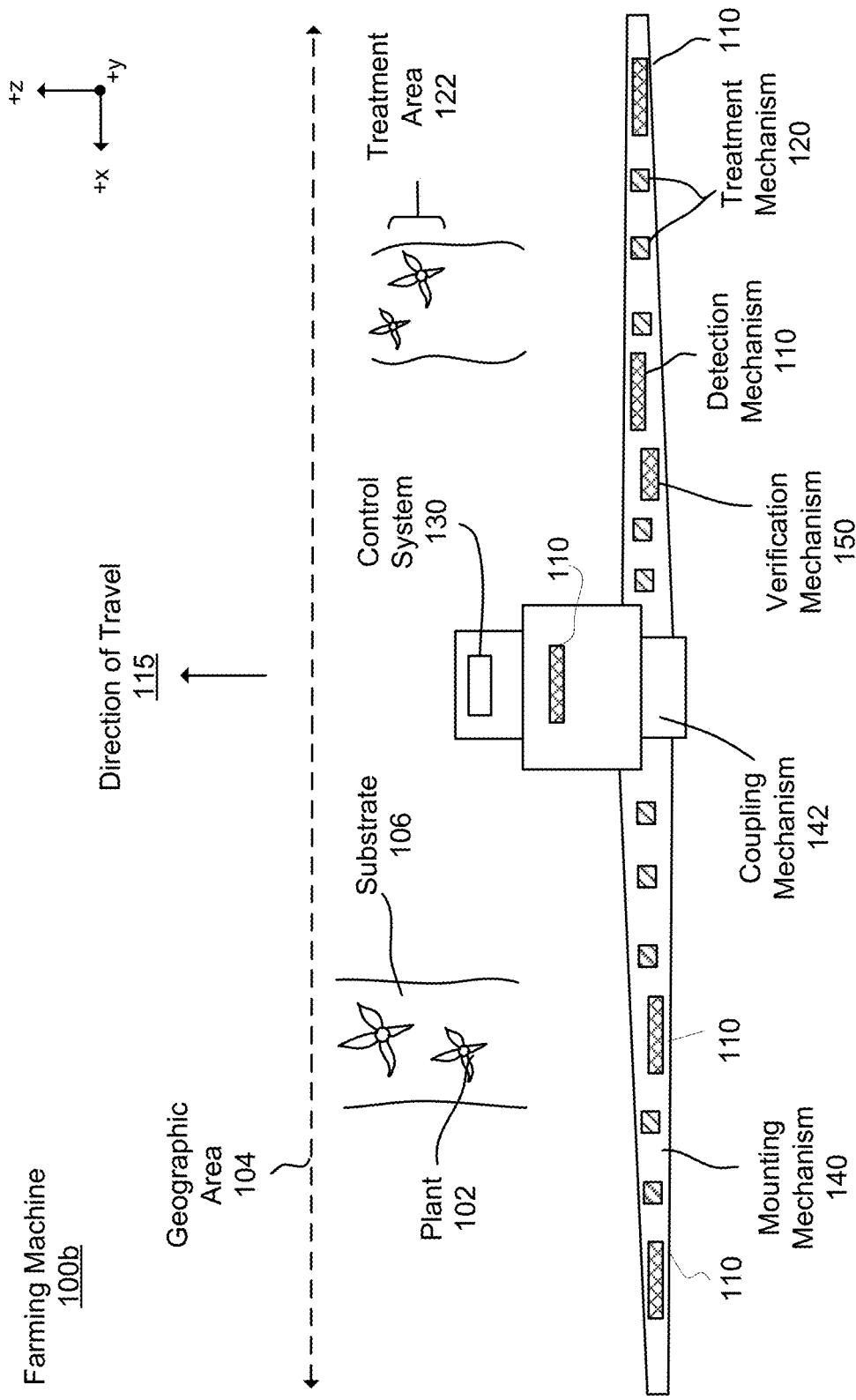
FIG. 1D illustrates a top view of a farming machine, in accordance with an embodiment.
Figure 1E:
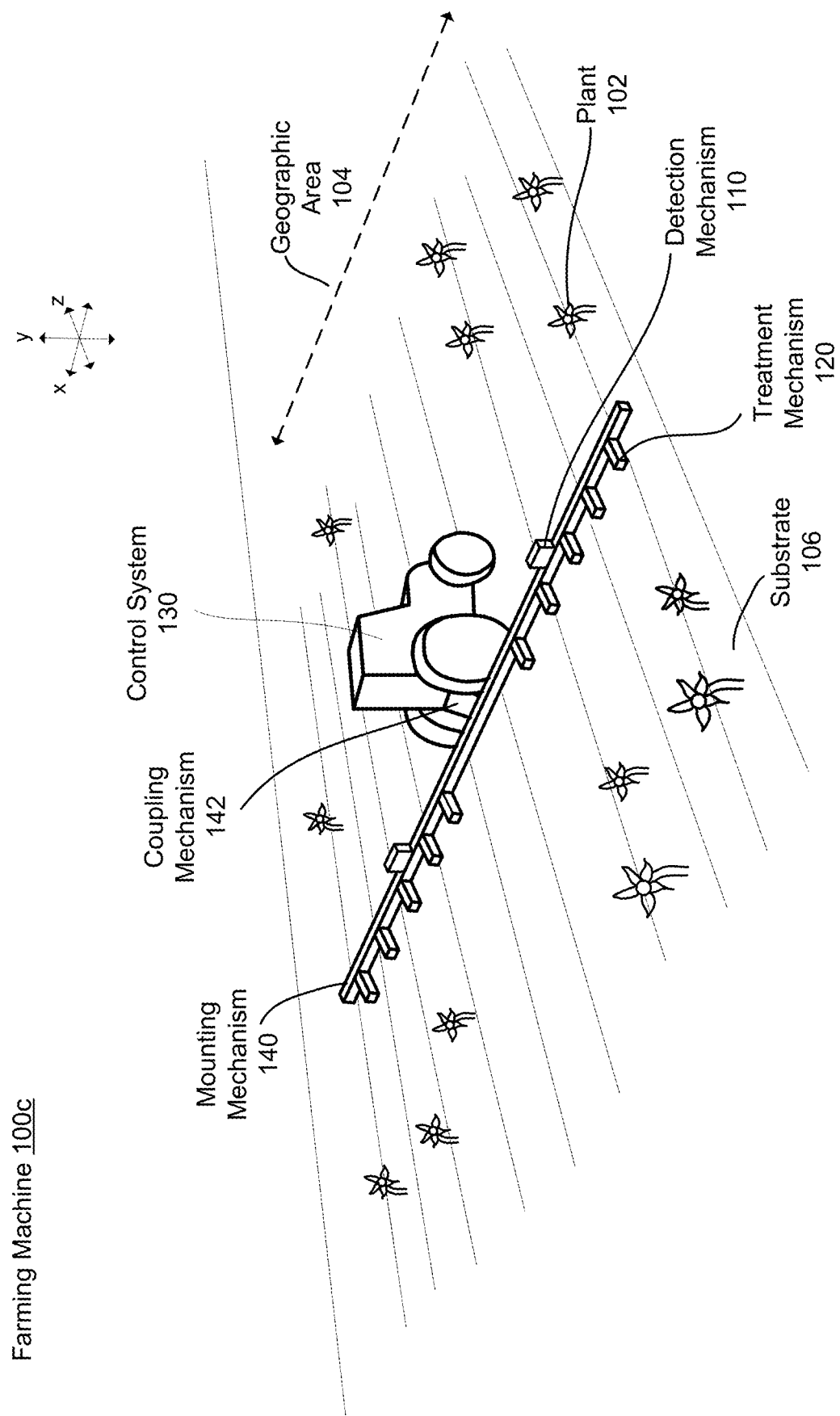
FIG. 1E illustrates an isometric view of a farming machine, in accordance with an embodiment.

A farming machine that identifies and treats plants may have a variety of configurations, some of which are described in greater detail below. For example, FIG. 1A is a side view of a first embodiment of a farming machine and FIG. 1B is a front view of the first embodiment of the farming machine of FIG. 1A. FIG. 1C is an isometric view of a second embodiment of a farming machine and FIG. 1D is a top view of the second embodiment of the farming machine of FIG. 1C. FIG. 1E is a third embodiment of a farming machine, in accordance with one embodiment. The farming machine 100a, 100b, 100c (collectively referred to as "farming machine 100") illustrated in FIGS. 1A-1E, includes a detection mechanism 110, a treatment mechanism 120, and a control system 130. The farming machine 100 can additionally include a mounting mechanism 140, a verification mechanism 150, a power source, digital memory, communication apparatus, or any other suitable component. The farming machine 100 can include additional or fewer components than described herein. Furthermore, the components of the farming machine 100 can have different or additional functions than described below.

The farming machine 100 functions to apply a treatment to one or more plants 102 within a geographic area 104. Often, treatments function to regulate plant growth. The treatment is directly applied to a single plant 102 (e.g., hygroscopic material), but can alternatively be directly applied to multiple plants, indirectly applied to one or more plants, applied to the environment associated with the plant (e.g., soil, atmosphere, or other suitable portion of the plant environment adjacent to or connected by an environmental factor, such as wind), or otherwise applied to the plants. Treatments that can be applied include necrosing the plant, necrosing a portion of the plant (e.g., pruning), regulating plant growth, or any other suitable plant treatment. Necrosing the plant can include dislodging the plant from the supporting substrate 106, incinerating a portion of the plant, applying a treatment concentration of working fluid (e.g., fertilizer, hormone, water, etc.) to the plant, or treating the plant in any other suitable manner. Regulating plant growth can include promoting plant growth, promoting growth of a plant portion, hindering (e.g., retarding) plant or plant portion growth, or otherwise controlling plant growth. Examples of regulating plant growth includes applying growth hormone to the plant, applying fertilizer to the plant or substrate, applying a disease treatment or insect treatment to the plant, electrically stimulating the plant, watering the plant, pruning the plant, or otherwise treating the plant. Plant growth can additionally be regulated by pruning, necrosing, or otherwise treating the plants adjacent the plant.

The plants 102 can be crops, but can alternatively be weeds or any other suitable plant. The crop may be cotton, but can alternatively be lettuce, soy beans, rice, carrots, tomatoes, corn, broccoli, cabbage, potatoes, wheat or any other suitable commercial crop. The plant field in which the system is used is an outdoor plant field, but can alternatively be plants within a greenhouse, a laboratory, a grow house, a set of containers, a machine, or any other suitable environment. The plants are grown in one or more plant rows (e.g., plant beds), wherein the plant rows are parallel, but can alternatively be grown in a set of plant pots, wherein the plant pots can be ordered into rows or matrices or be randomly distributed, or be grown in any other suitable configuration. The crop rows are generally spaced between 2 inches and 45 inches apart (e.g. as determined from the longitudinal row axis), but can alternatively be spaced any suitable distance apart, or have variable spacing between multiple rows.

The plants 102 within each plant field, plant row, or plant field subdivision generally includes the same type of crop (e.g. same genus, same species, etc.), but can alternatively include multiple crops (e.g., a first and a second crop), both of which are to be treated. Each plant 102 can include a stem, arranged superior (e.g., above) the substrate 106, which supports the branches, leaves, and fruits of the plant. Each plant can additionally include a root system joined to the stem, located inferior the substrate plane (e.g., below ground), that supports the plant position and absorbs nutrients and water from the substrate 106. The plant can be a vascular plant, non-vascular plant, ligneous plant, herbaceous plant, or be any suitable type of plant. The plant can have a single stem, multiple stems, or any number of stems. The plant can have a tap root system or a fibrous root system. The substrate 106 is soil, but can alternatively be a sponge or any other suitable substrate.

The detection mechanism 110 is configured to identify a plant for treatment. As such, the detection mechanism 110 can include one or more sensors for identifying a plant. For example, the detection mechanism 110 can include a multispectral camera, a stereo camera, a CCD camera, a single lens camera, hyperspectral imaging system, LIDAR system (light detection and ranging system), RADAR system (Radio Detection and Ranging system), a depth sensing system, dynamometer, IR camera, thermal camera, humidity sensor, light sensor, temperature sensor, or any other suitable sensor. In one embodiment, and described in greater detail below, the detection mechanism 110 includes an array of image sensors configured to capture an image of a plant. In some example systems, the detection mechanism 110 is mounted to the mounting mechanism 140, such that the detection mechanism 110 traverses over a geographic location before the treatment mechanism 120 as the farming machine 100 moves traverses through the geographic location. However, in some embodiments, the detection mechanism 110 traverses over a geographic location at substantially the same time as the treatment mechanism 120. In an embodiment of the farming machine 100, the detection mechanism 110 is statically mounted to the mounting mechanism 140 proximal the treatment mechanism 120 relative to the direction of travel 115. In other systems, the detection mechanism 110 can be incorporated into any other component of the farming machine 100.

The treatment mechanism 120 functions to apply a treatment to an identified plant 102. The treatment mechanism 120 applies the treatment to the treatment area 122 as the farming machine 100 moves in a direction of travel 115. The effect of the treatment can include plant necrosis, plant growth stimulation, plant portion necrosis or removal, plant portion growth stimulation, or any other suitable treatment effect as described above. The treatment can include plant 102 dislodgement from the substrate 106, severing the plant (e.g., cutting), plant incineration, electrical stimulation of the plant, fertilizer or growth hormone application to the plant, watering the plant, light or other radiation application to the plant, injecting one or more working fluids into the substrate 106 adjacent the plant (e.g., within a threshold distance from the plant), or otherwise treating the plant. In one embodiment, the treatment mechanisms 120 are an array of spray treatment mechanisms. The treatment mechanisms 120 may be configured to spray one or more of: an herbicide, a fungicide, water, or a pesticide. The treatment mechanism 120 is operable between a standby mode, wherein the treatment mechanism 120 does not apply a treatment, and a treatment mode, wherein the treatment mechanism 120 is controlled by the control system 130 to apply the treatment. However, the treatment mechanism 120 can be operable in any other suitable number of operation modes.

The farming machine 100 may include one or more treatment mechanisms 120. A treatment mechanism 120 may be fixed (e.g., statically coupled) to the mounting mechanism 140 or attached to the farming machine 100 relative to the detection mechanism 110. Alternatively, the treatment mechanism 120 can rotate or translate relative to the detection mechanism 110 and/or mounting mechanism 140. In one variation, such as in FIGS. 1A-1B, the farming machine 100a includes a single treatment mechanism, wherein the treatment mechanism 120 is actuated or the farming machine 100a moved to align the treatment mechanism 120 active area 122 with the targeted plant 102. In a second variation, the farming machine 100 includes an assembly of treatment mechanisms, wherein a treatment mechanism 120 (or subcomponent of the treatment mechanism 120) of the assembly is selected to apply the treatment to the identified plant 102 or portion of a plant in response to identification of the plant and the plant position relative to the assembly. In a third variation shown, such as in FIGS. 1C-1E, the farming machine (i.e., 100b, 100c) includes an array of treatment mechanisms 120, wherein the treatment mechanisms 120 are actuated or the farming machine (i.e., 100b, 100c) is moved to align the treatment mechanism 120 active areas 122 with the targeted plant 102 or plant segment.

The farming machine 100 includes a control system 130 for controlling operations of system components. The control system 130 can receive information from and/or provide input to the detection mechanism 110, the verification mechanism 150, and the treatment mechanism 120. The control system 130 can be automated or can be operated by a user. In some embodiments, the control system 130 may be configured to control operating parameters of the farming machine 100 (e.g., speed, direction). The control system 130 also controls operating parameters of the detection mechanism 110. Operating parameters of the detection mechanism 110 may include processing time, location and/or angle of the detection mechanism 110, image capture intervals, image capture settings, etc. The control system 130 may be a computer, as described in greater detail below in relation to FIG. 9. The control system 130 can apply one or more models to identify one or more plants in the field. The control system 130 may be coupled to the farming machine 100 such that an operator (e.g., a driver) can interact with the control system 130. In other embodiments, the control system 130 is physically removed from the farming machine 100 and communicates with system components (e.g., detection mechanism 110, treatment mechanism 120, etc.) wirelessly.

In some configurations, the farming machine 100 includes a mounting mechanism 140 that functions to provide a mounting point for the system components. In one example, as shown in FIG. 1A-1B, the mounting mechanism 140 statically retains and mechanically supports the positions of the detection mechanism 110, the treatment mechanism 120, and the verification mechanism 150 relative to a longitudinal axis of the mounting mechanism 140. The mounting mechanism 140 is a chassis or frame, but can alternatively be any other suitable mounting mechanism. In the embodiment of FIGS. 1C-1E, the mounting mechanism 140 extends outward from a body of the farming machine (i.e., 100b, 100c) in the positive and negative x-direction (in the illustrated orientation of FIGS. 1A-1E) such that the mounting mechanism 140 is approximately perpendicular to the direction of travel 115. The mounting mechanism 140 in FIGS. 1C-1E includes an array of treatment mechanisms 120 positioned laterally along the mounting mechanism 140. In alternate configurations, there may be no mounting mechanism 140, the mounting mechanism 140 may be alternatively positioned, or the mounting mechanism 140 may be incorporated into any other component of the farming machine 100.

The farming machine 100 includes a first set of coaxial wheels and a second set of coaxial wheels, wherein the rotational axis of the second set of wheels is parallel with the rotational axis of the first set of wheels. In the first embodiment, each wheel in each set is arranged along an opposing side of the mounting mechanism 140 such that the rotational axes of the wheels are approximately perpendicular to the mounting mechanism 140. In the second and third embodiments of the farming machine, the rotational axes of the wheels are approximately parallel to the mounting mechanism 140. In alternative embodiments, the system can include any suitable number of wheels in any suitable configuration. The farming machine 100 may also include a coupling mechanism 142, such as a hitch, that functions to removably or statically couple to a drive mechanism, such as a tractor, more to the rear of the drive mechanism (such that the farming machine 100 is dragged behind the drive mechanism), but can alternatively be attached to the front of the drive mechanism or to the side of the drive mechanism. Alternatively, the farming machine 100 can include the drive mechanism (e.g., a motor and drive train coupled to the first and/or second set of wheels). In other example systems, the system may have any other means of traversing through the field.

In some configurations, the farming machine 100 additionally include a verification mechanism 150 that functions to record a measurement of the ambient environment of the farming machine 100. The farming machine may be use the measurement to verify or determine the extent of plant treatment. The verification mechanism 150 records a measurement of the geographic area previously measured by the detection mechanism 110. The verification mechanism 150 records a measurement of the geographic region encompassing the plant treated by the treatment mechanism 120. The verification mechanism 150 measurement can additionally be used to empirically determine (e.g., calibrate) treatment mechanism operation parameters to obtain the desired treatment effect. The verification mechanism 150 can be substantially similar (e.g., be the same type of mechanism as) the detection mechanism 110, or can be different from the detection mechanism 110. In some embodiments, the verification mechanism 150 is arranged distal the detection mechanism 110 relative the direction of travel, with the treatment mechanism 120 arranged there between, such that the verification mechanism 150 traverses over the geographic location after treatment mechanism 120 traversal. However, the mounting mechanism 140 can retain the relative positions of the system components in any other suitable configuration. In other configurations of the farming machine 100, the verification mechanism 150 can be included in other components of the system.

In some configurations, the farming machine 100 may additionally include a power source, which functions to power the system components, including the detection mechanism 110, control system 130, and treatment mechanism 120. The power source can be mounted to the mounting mechanism 140, can be removably coupled to the mounting mechanism 140, or can be separate from the system (e.g., located on the drive mechanism). The power source can be a rechargeable power source (e.g., a set of rechargeable batteries), an energy harvesting power source (e.g., a solar system), a fuel consuming power source (e.g., a set of fuel cells or an internal combustion system), or any other suitable power source. In other configurations, the power source can be incorporated into any other component of the farming machine 100.

In some configurations, the farming machine 100 may additionally include a communication apparatus, which functions to communicate (e.g., send and/or receive) data between the control system 130 and a set of remote devices. The communication apparatus can be a Wi-Fi communication system, a cellular communication system, a short-range communication system (e.g., Bluetooth, NFC, etc.), or any other suitable communication system.

Figure 1F:
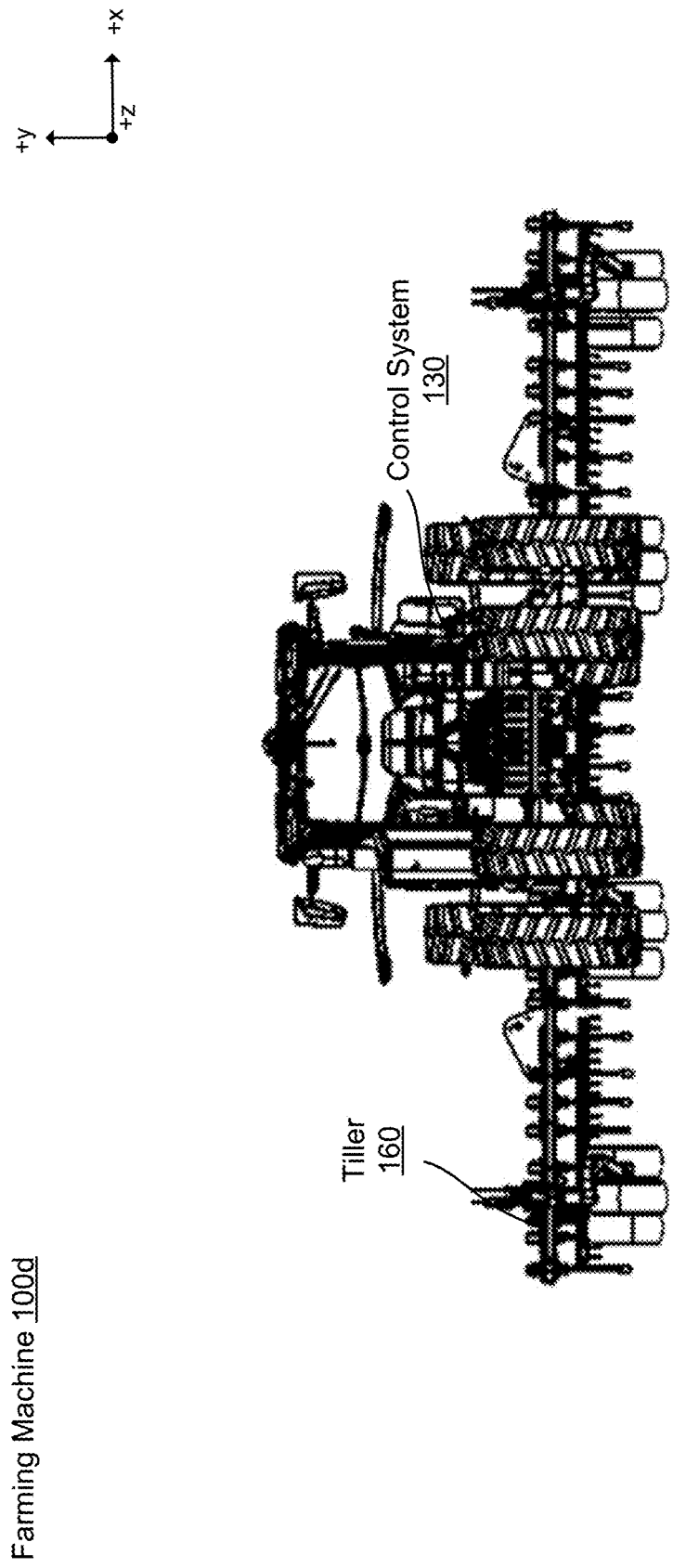
FIG. 1F illustrates a front view of a farming machine with a tiller, in accordance with an embodiment.
Figure 1G:
FIG. 1G illustrates an isometric view of a farming machine with a tiller, in accordance with an embodiment.
Figure 1H:
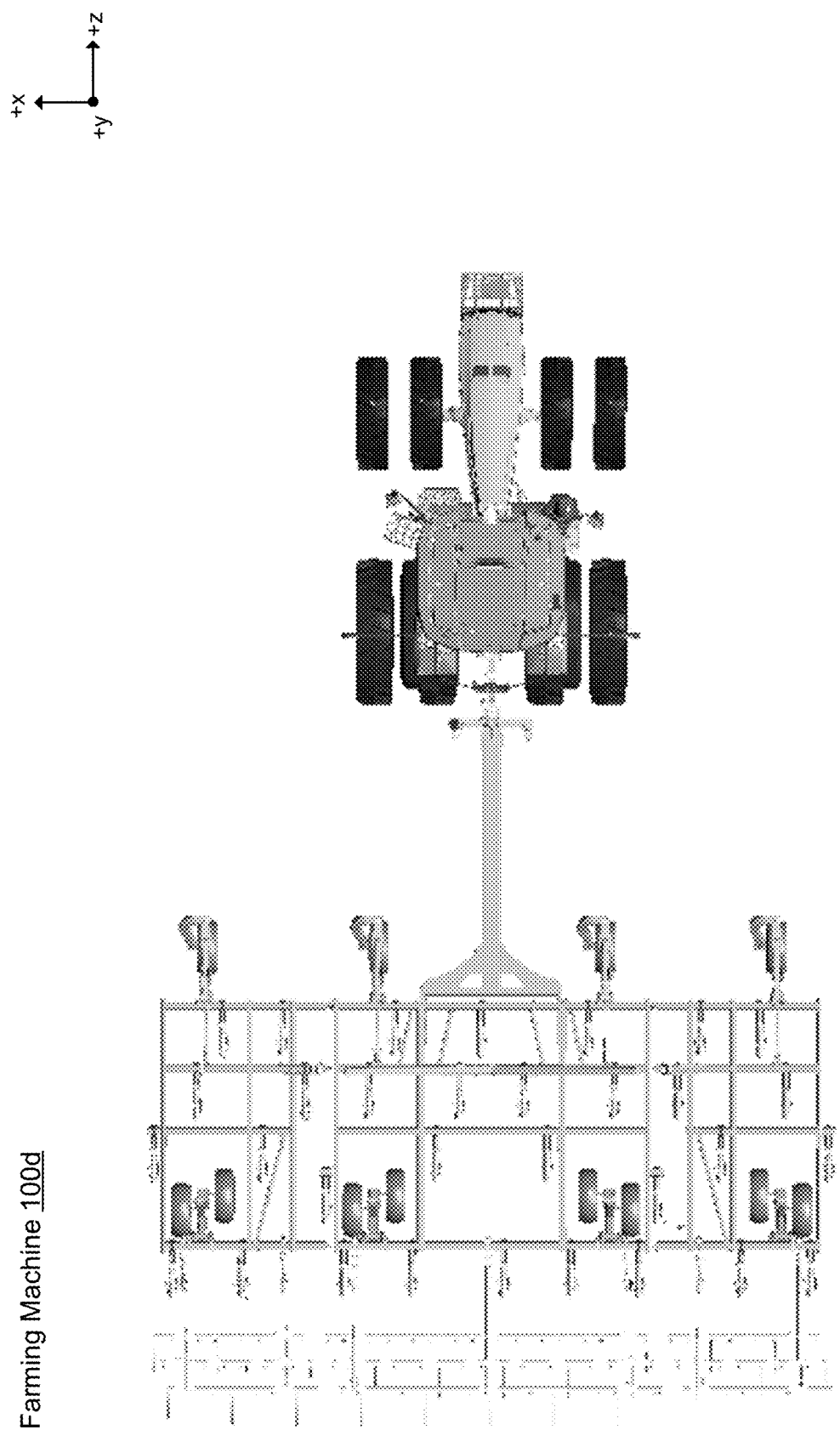
FIG. 1H illustrates a top view of a farming machine with a tiller, in accordance with an embodiment.

FIG. 1F illustrates a front view of a farming machine with a tiller, in accordance with an embodiment. FIG. 1G illustrates an isometric view of the farming machine with the tiller, and FIG. 1H illustrates a top view of the farming machine with the tiller. The farming machine 100d, illustrated in FIGS. 1F-1H may be a variation of the farming machine 100a, 100b, 100c illustrated in FIGS. 1A-1E. The farming machine 100d includes a tiller attached to a body of the farming machine 100d configured to prepare soil for planting by tilling the field as the farming machine 100d travels. The farming machine 100d may include one or more of a detection mechanism 110, a treatment mechanism 120, a control system 130, a mounting mechanism 140, a verification mechanism 150, a power source, digital memory, communication apparatus, or any other suitable component discussed with respect to FIGS. 1A-1E.

A. System Network

Figure 2:
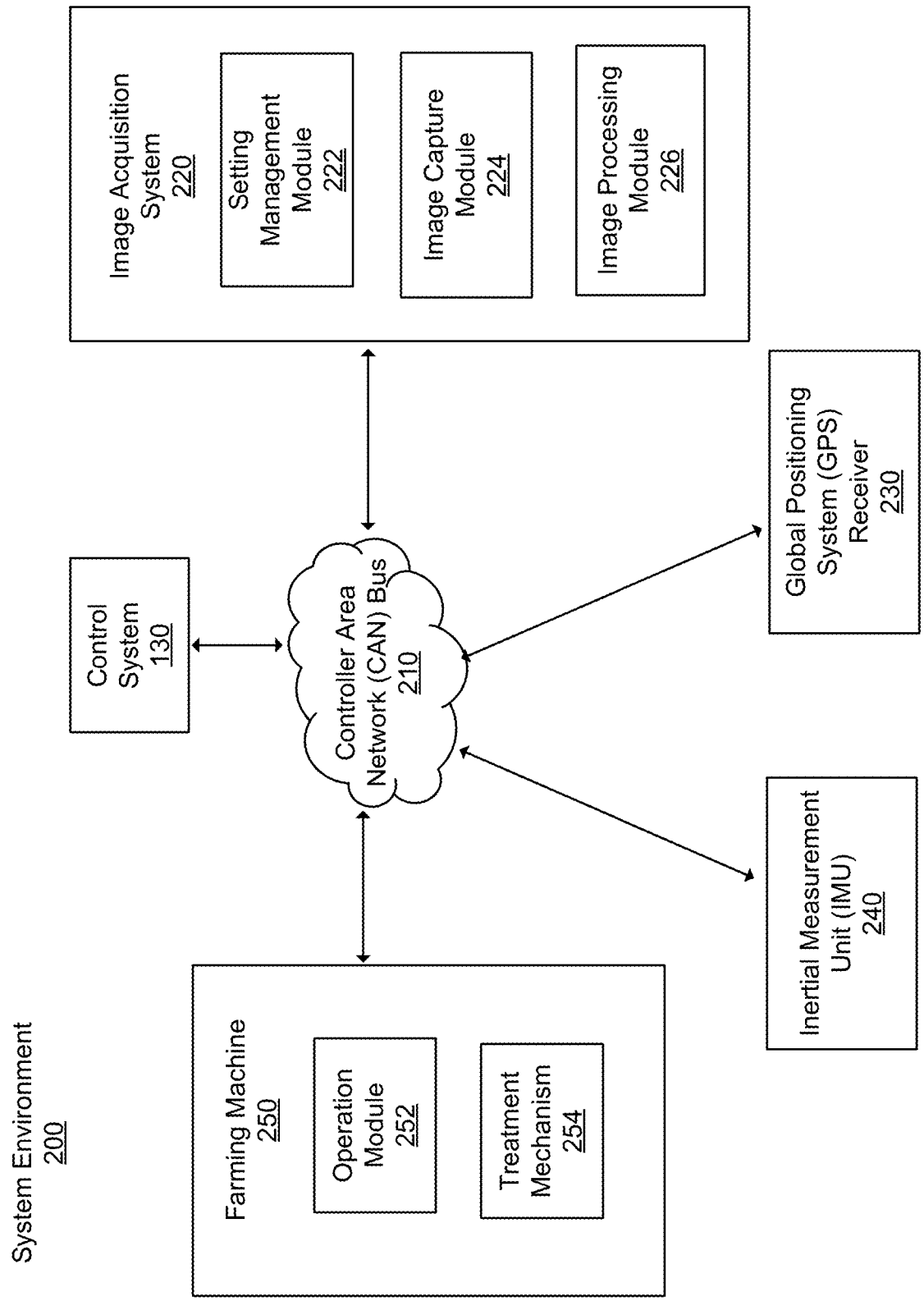
FIG. 2 is a block diagram illustrating a system environment of a farming machine, in accordance with an embodiment.

FIG. 2 illustrates a block diagram illustrating a system environment of a farming machine, in accordance with an environment. The system environment 200 includes an image acquisition system 220, a global positioning system (GPS) receiver 230, an inertial measurement unit (IMU) 240, a farming machine 250, and a control system 130 connected via a controller area network (CAN) bus 210. In alternative embodiments, the system environment 200 includes additional or fewer components than described herein. The functions of the components may also be distributed in a different manner than described below.

The control system 130 is configured to perform real-time calibration of the image acquisition system 220 in relation to the IMU 240 and the GPS receiver 230 as the farming machine 250 moves through a field. As the farming machine 250 moves through the field, the farming machine 250 continuously captures images of its surroundings using the image acquisition system 220, the images including image data of objects in the field such as a plant, a weed, a tree, a fence, a lamppost, a rock, a worker, a farm animal, a building, a farming equipment. The control system 130 identifies objects in the captured images and labels the objects by identifying types of objects (e.g., identify a label "fence" for a portion of an image) as well as pixel locations or bounding boxes of the objects in the image. Each pixel location corresponds to a coordinate associated with a latitude, longitude, and a latitude. In some embodiments, based on the pixel locations or the bounding box of an object, the control system 130 may determine a coordinate of a center of the object and assign the coordinate of the center to be the location of the object. The control system 130 may use image segmentation or other detection methods to detect and identify the objects. The control system 130 then generates a represented 3-dimensional model of the environment including the objects by mapping motion data from the IMU 240 and location data from the GPS receiver 230. From the represented 3-dimensional model, the control system 130 can determine represented locations of objects captured in the images. However, the represented locations may not match with actual locations of the objects of the real-world, which can cause the farming machine 250 to perform farming operations inefficiently or incorrectly.

The control system 130 compares the represented locations to known reference locations. Based on a comparison of the represented locations and the reference locations, the control system 130 may determine whether an adjustment is necessary to align the represented locations with the reference locations such that the farming machine 250 may perform farming operations as expected.

The image acquisition system 220 includes a plurality of cameras and is configured to capture images of a surrounding environment of the farming machine 250 as the farming machine 250 travels through the field. The image acquisition system 220 can capture images at specified time intervals, at one or more specified times during operation of the farming machine 200, randomly, or according to other parameters set by the control system 130. In some embodiments, the cameras of the image acquisition system 220 function collectively. For example, each camera of the image acquisition system 220 is configured to capture images simultaneously (e.g., every 15 seconds, every 0.5 seconds, etc.). In other embodiments, each camera functions independently. For example, a first camera captures an image at a first time (e.g., at 12:00) and a second camera captures an image at a subsequent time (e.g., at 12:01). Alternatively, some of the cameras operate collectively, while others operate independently. The image acquisition system 220 includes a setting management module 222, an image capture module 224, and an image processing module 226. In alternative embodiments, the image acquisition system 220 includes fewer or greater components than described herein.

The setting management module 222 is configured to adjust exposure settings (e.g., aperture, shutter speed, ISO speed) and white balance of the image capture module 224. The setting management module 222 may be configured to adjust additional settings (e.g., focus, flash, zoom, etc.) of the image capture module 224. The setting management module 222 may be configured to adjust one or more settings at regular time intervals, at a specified time, each time the system resets, randomly, based on input from the control system 130, or according to other suitable methods. The setting management module 222 may also adjust a position of the one or more cameras of the image acquisition system 220. Based on calibration results, the control system 130 may provide instructions to the setting management module 222 to adjust settings of the image capture module 224.

The image capture module 224 is configured to capture images of an environment surrounding the farming machine 250. The image capture module 224 includes a plurality of cameras that are disposed at different positions throughout the farming machine 250. The image capture module 224 may also be referred to as "cameras" hereinafter. The image capture module 224 has initial settings (e.g., default settings when the system turns on, resets, etc.) that can be adjusted by the setting management module 222. In some embodiments, initial settings of the image capture module 224 are settings corresponding to an operational condition (e.g., settings for a typical sunny day in the spring, for a certain time of day, etc.). In some cases, an operator of the farming machine 250 may input the operational condition such that the initial settings are appropriate. In other embodiments, the initial settings can be randomly assigned, set by the control system 130, set by an operator, or determined according to any appropriate method. The setting management module 222 continuously monitors and adjusts the settings of the image capture module 224 during operation. The image capture module 224 can be configured to capture an image(s) at specified intervals, at a specified time, at random time intervals, as determined by the control system 130, or according to any other suitable guidelines. The plurality of cameras of the image capture module 224 may each correspond to a different field of view (FOV). In some embodiments, the FOV of two or more cameras may include an overlap region.

The image processing module 226 processes an image captured by the image capture module 224. Processing the image includes evaluating and/or modifying image qualities, identifying a plant in the image, or evaluating plant properties. Modifying the image can include resizing, debayering, cropping, value normalization, and adjusting image qualities such as contrast, brightness, exposure, temperature, etc. Identifying the plant can include determining the type of plant and/or the location of the plant. In some embodiments, evaluating plant properties also includes determining other characteristics of the plant identified in the image and adjusting settings appropriately. Some characteristics of the plant may include, for example, Normalized Difference Vegetation Index (NDVI), Transformed Chlorophyll Absorption in Reflectance Index normalized by Optimized Soil-Adjusted Vegetation Index (TCARI/OSAVI), Normalized Difference Red Edge Index (NDRE), Canopy Chlorophyll Content Index (CCCI), Photochemical Reflectance Index (PRI), etc. Additionally, the image processing module 226 can evaluate plant properties to determine if the plant is healthy and/or if the plant needs treatment. In an embodiment, the image processing module employs a plant identification model to identify a plant, a plant type, plant features, etc. An example of a plant identification model employed by the image processing model is described in U.S. patent application Ser. No. 16/126,842 titled "Semantic Segmentation to Identify and Treat Plants in a Field and Verify the Plant Treatments," filed on Sep. 10, 2018, but other plant identification models are also possible.

The GPS receiver 230 is configured to determine a geolocation of the farming machine 250 at a given time. The GPS receiver 230 determines a latitude and longitude coordinates of the farming machine 250 of the farming machine 250 as it moves through the field. Because the location of the farming machine 250 is known, the locations of objects in the field may be determined relative to the location of the farming machine 250.

The IMU 240 is configured to collect motion data of the farming machine 250. As the farming machine 250 travels, the IMU 240 collects the motion data that reflects the current movement of the farming machine 250. The IMU includes a combination of accelerometers, gyroscopes, and/or magnetometers and detects changes in pitch, roll, and yaw according to the motions of the farming machine 250.

The farming machine 250 includes an operation module 252 and a treatment mechanism 254. The farming machine 250 may be any of the farming machines 100 described in relation to FIG. 1A-1H, or some other farming machine. The operation module 252 controls the operations (e.g., speed, direction) of the farming machine 250. In some embodiments, a user (e.g., a driver of a farming machine) provides input to the operation module 252 to affect operation of the farming machine 250 or the image acquisition system 220. In other embodiments, the control system 130 controls the operation module 252 such that the farming machine 100 is semi-autonomous or autonomous (e.g., operates without user input). Additionally, the control system 130 controls the treatment mechanism 254 to treat identified plants. The treatment mechanism 254 can be a plurality of treatment devices and types, as described above in relation to FIGS. 1A-1H.

The controller area network (CAN) bus 210 connects nodes of the system environment 200 to allow microcontrollers and devices to communicate with each other. In some embodiments, the components connected to the CAN bus 210 each have an input and output connection, and the CAN bus 210 acts as a translation mechanism for the components. For example, the CAN bus 210 receives input information from the image acquisition system 220, GPS receiver 230, IMU 240, processes the information, and transmits the information to the control system 130. The control system 130 calibrates the image acquisition system 220 based on the received information and transmits the setting adjustment to the image acquisition system 220. Further, the CAN bus 210 receives and transmits the information to the farming machine 250 in order to actuate a treatment mechanism 244.

Additionally, while the system environment 200 is represented as a CAN system in FIG. 2, the system environment 200 may be other types network environments, or a combination of network environments. For example, the system environment, can be a network such as the Internet, a LAN, a MAN, a WAN, a mobile wired or wireless network, a private network, a virtual private network, a direct communication line, and the like.

The control system 130, described above in relation to FIGS. 1A-1H, communicates with the image acquisition system 220, GPS receiver 230, IMU 240, and the farming machine 250 to calibrate the image acquisition system 220. Specifically, the control system 130 receives images captured by the image acquisition system 220, location data from the GPS receiver 230, and motion data from the IMU 240 and calibrates cameras in the image acquisition system 220 in real-time based on the received data. The control system 130 also communicates with the farming machine 250 via the CAN bus 210 to perform farming operations after calibrating the image acquisition system 220. In some embodiments, the control system 130 actuates one or more treatment mechanisms 254. Instructions generated by the control system 130 may be transmitted to a treatment mechanism 254 using ethernet connections, CAN bus 210 connections, or another transmission protocol. In various embodiments, the control system 130 may perform actions prescribed to other systems and modules in the system environment 200. For example, the control system 130 may identify a plant rather than the image processing module 226. Similarly, the control system 130 may determine a setting for an image acquisition system 220. Details on the control system 130 is described below with respect to FIG. 3.

Although not illustrated in FIG. 2, the control system 130 may also communicate with other systems over a network (e.g., network 926) comprising any combination of local area and/or wide area networks, using both wired and/or wireless communication systems. In one embodiment, the network uses standard communications technologies and/or protocols. For example, the network includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 110 may be represented using any suitable format, such as hypertext markup language (HTML), extensible markup language (XML), or JavaScript object notation (JSON). In some embodiments, all or some of the communication links of the network 120 may be encrypted using any suitable technique or techniques. In some embodiments, one or more functions described below with respect to the control system 130 may be performed by another system (e.g., online) and communicated to the control system 130 via the network.

Figure 3:
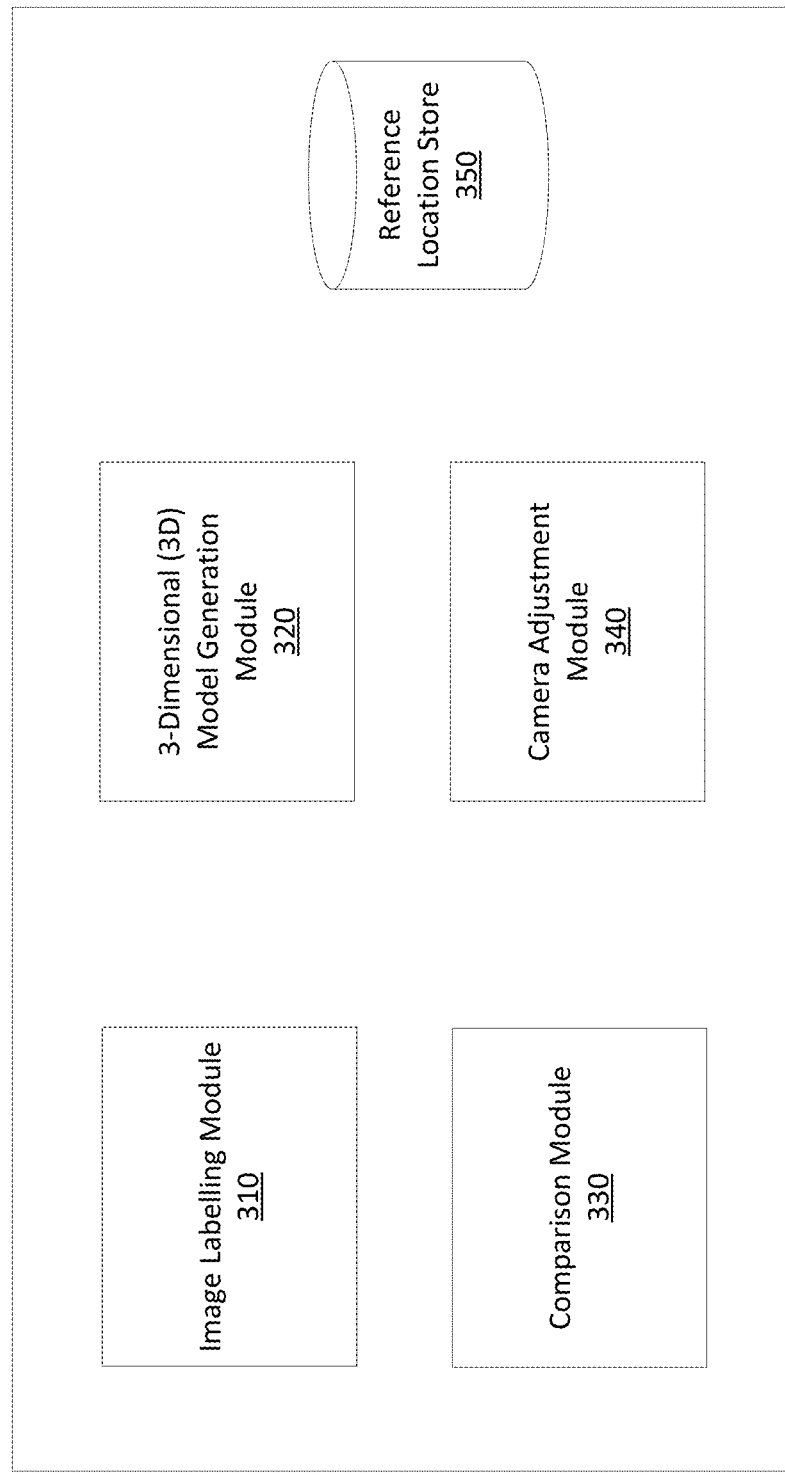
FIG. 3 is a block diagram illustrating a control system of a farming machine, in accordance with an embodiment.

FIG. 3 is a block diagram illustrating a control system of a farming machine, in accordance with an embodiment. The control system 130 includes an image labelling module 310, a 3-dimensional (3D) model generation module 320, a comparison module 330, a camera adjustment module 340, and a reference location store 350. In some embodiments, the control system 130 may include additional or fewer components than described herein. The functions of the components may also be distributed in a different manner than described below.

The control system 130 obtains images of a field using the image acquisition system 220, location data of the farming machine 250 using the GPS receiver 230, and motion data of the farming machine 250 using the IMU 240 as the farming machine 250 travels through the field. The control system 130 determines represented locations of objects that are captured in the images and compares the represented locations to known reference locations of the objects. Based on the comparison of the represented locations to the reference locations, the control system 130 adjusts the settings of cameras of the image acquisition system 220 or makes digital modifications to captured images to improve accuracy of the image acquisition system 220 and ensure that the farming machine 250 may have consistent results for farming operations. A user of the farming machine 250 may calibrate the image acquisition system 220 before using the farming machine 250 to perform farming operations for the first time or periodically (e.g., every 3 months). In some embodiments, the control system 130 may determine when an error in farming operations exceeds a threshold and determine that another calibration is required for the image acquisition system 220.

During calibration, the farming machine 250 may be driven back and forth across the field to capture images of the entire field. For example, the farming machine 250 may travel along a serpentine-shaped path to an opposite end of the field, turn around and return to the starting end. The farming machine 250 may repeat traveling back and forth until it covers an entire area of the field. Each obtained image includes image data that represents various objects in the field. For example, an image can include image data representing one or more of: a plant, a weed, a tree, a fence, a lamppost, a rock, a worker, a farm animal, a building, a farming equipment, and other objects that may exist within the field. In some embodiments, the images captured by the farming machine 250 may include objects that are in the surrounding environment outside of field. For example, a lamppost or a traffic light along a street near the field may be captured and used for calibration. The image data can include color, shapes, sizes, metadata of the image, detection mechanism characteristics, pixel information, etc. The control system 130 identifies the objects in the field using the image data. Additionally, the control system 130 may determine depth information associated with the objects based on convolutional neural network (CNN), stereo cameras, light detection and ranging (LIDAR), or other methods of depth determination. Based on the identified objects, the control system 130 can calibrate one or more cameras in the image acquisition system 220 as described herein.

The image labelling module 310 receives images captured by the image acquisition system 220 and identifies various objects within the images and pixel locations associated with the objects. The image labelling module 310 may be a machine-learned model that executes a pixelwise semantic segmentation ("semantic segmentation") to identify the objects. For example, the image labelling module 310 may receive images and identify a type of object (e.g., identify a label "fence" for a portion of an image) as well as pixel locations or a bounding box around each of the detected objects in the images. The image labelling module 310 may generate labelled images including semantic information related to each identified object such as the type of object and pixels locations or the bounding box identifying portion of the image in which the object is captured. The image labelling module 310 may include one or more models that operate sequentially or in parallel to generate the labelled images. The image labelling module 310 may be implemented as a variety of machine-learned models or trainable networks. For example, the image labelling module 310 may be a neural network, a decision tree, a classifier, or other type of computer model, and any combination thereof, that identifies objects in the images provided to the image labelling module 310. The image labelling module 310 may be trained from a set of training data and images of objects commonly found in a field to learn weights and parameters for effectively performing the image segmentation.

The 3D model generation module 320 receives the labelled images from the image labelling module 310 and generates a represented 3-dimensional (3D) model of the field based on the labelled images. The image acquisition system 220, the GPS receiver 230, and the IMU 240 are synchronized, and the 3D model generation module 320 generates the represented three-dimensional model using a combination of information from the image acquisition system 220, the GPS receiver 230, and the IMU 240. The 3D model generation module 320 maps the motion data from the IMU 240 and the location data from the GPS receiver 230 onto the image data from the image acquisition system 220 to generate the represented 3D model. Based on the represented 3D model, the control system 130 can extract a 6-dimensional vector (x-coordinate, y-coordinate, z-coordinate, pitch, yaw, roll) indicative of a represented location of each object. The 3D model generation module 320 may generate a reference model in a similar manner as the represented model and determine reference locations based on the reference model, where the reference model is generated using previously captured images or images captured by different cameras.

In some embodiments, the 3D model generation module 320 uses visual-inertial simultaneous localization and mapping (VI-SLAM) based on the labelled images of the field, the motion data from the IMU 240, and the location data from the GPS receiver 230 to generate the represented 3D model of the field. The VI-SLAM combines the image data, the motion data, and the location data to estimate the position and orientation (also referred to as "pose") of the objects in a 3-dimensional space relative to the cameras or the pose of the camera relative to the objects. The VI-SLAM may be implemented using MonoSLAM, PTAM, Rat-SLAM, DTAM, KinectFusion, ORB-SLAM, Kimera-SLAM or other types of methods. Each pixel in the labelled images can be mapped to a position in space (e.g., coordinates) based on the motion data and the location data. Since the image labelling module 310 has identified the objects and their corresponding pixel locations within the images, the positions of the objects in the real-world can be estimated. The 3D model generation module 320 may first generate the represented 3D model using the SLAM model based on the labelled images and the motion data and then assign coordinates to objects in the 3D model based on the location data. Alternatively, the 3D model generation module 320 may first determine a position in space for pixels in the labelled images corresponding to a position in space and then use the labelled images to generate the represented 3D model. The 3D model may be displayed based on fixed CAD values. Based on the represented 3D model, the 3D model generation module 320 can determine represented locations associated with the objects by extracting a 6-dimensional vector (x-coordinate, y-coordinate, z-coordinate, pitch, yaw, roll) for each object.

In some embodiments, the 3D model generation module 320 may select key featured objects and output data associated with the key featured objects to be used for the camera calibration. By selecting the key featured objects instead of using all of the identified objects, the control system 130 can reduce computation complexity. Key featured objects may be objects that are stationary and at least a threshold in size such as buildings, lampposts, signs, and trees.

In some embodiments, the reference location is determined based on images of the object captured by a first camera and the represented location is determined based on images of the object captured by a second camera different from the first camera. The first camera may be a high accuracy imaging device with higher accuracy than other cameras in the image acquisition system 220 and may be used as a standard for calibrating the other cameras such as the second camera. In some embodiments, the cameras in the image acquisition system 220 are same types of cameras. As the farming machine 250 travels through the field, the first camera and the second camera continuously capture image of the field including a plurality of objects. The field of view of the first camera and the field of view of the second camera may include an overlap region such that one or more pixels in images captured by the first camera are also in images captured by the second camera. Using images captured by the first camera, the 3D model generation module 320 generates a reference 3D model and determines reference locations of the objects captured in the images. Using images captured by the second camera, the 3D model generation module 320 generates a represented 3D model and determines represented locations of the objects to be compared against the reference locations. In some embodiments, the first camera may be a wide field of view camera that covers fields of view of multiple cameras including the second camera. That is, multiple cameras may be calibrated against the first camera and adjusted to be aligned with the first camera.

In some embodiments, the reference location is determined based on images of the object captured by the image acquisition system 220 during a previous pass through the field. During calibration, the farming machine 250 may be instructed to make multiple passes through the field such that the image acquisition system 220 may capture images of the object during different passes. For example, during a first pass through the field, the control system 130 determines a location of a lamppost in the field based on images captured by the image acquisition system 220 during the first pass. The determined location of the lamppost is stored in the reference location store 350 as a reference location for the lamppost to be used in the future. When the farming machine 250 makes a second pass through the field, the control system 130 determines a location of the lamppost based on images captured by the image acquisition system during the second pass. The determined location of the lamppost from the second pass is the represented location of the lamppost that is compared with the reference location of the lamppost from the first pass. The control system 130 calibrates the image acquisition system 220 based on a comparison of the reference location and the represented location of the lamppost and adjusts the settings of the cameras such that the represented location and the reference location of the lamppost are aligned. The farming machine 250 may perform multiple iterations of calibration until the represented location of an object is within a threshold of the reference location without further adjustment. For example, the reference location of the lamppost may indicate that the lamppost is at $(x_1, y_1, z_1)$ and the represented location may be at $(x_2, y_1, z_1)$, where $x_1$ and $x_2$ are different values. The difference of $x_1$ and $x_2$ can reveal that the camera used to capture images used to generate the represented 3D model is tilted at an angle proportional to the difference or that one or more optical elements of the camera require adjustment to shift the represented location to become $x_1$ to match with the reference location.

In some embodiments, predefined objects such as GPS receivers may be placed around the field to be used for calibration. The geolocations detected by the GPS receivers may be used as reference locations, and the determined locations of the GPS receivers based on the images may be compared to the reference locations. In some embodiments, after being used to calibrate one field, the GPS receivers may be retrieved and placed in another field to perform calibration on the other field. Objects may be other farming equipment (e.g., trailer, tiller, sprayer) including GPS receivers. The farming machine 250 may be connected to the other farming equipment through a network and transmit location information to and receive location information from the other farming equipment. For example, the control system 130 may receive geolocations of the other farming equipment to be used as reference locations. Alternatively, other farming equipment may also determine locations of objects in the field observed by the farming machine 250. The control system 130 of the farming machine 250 may determine represented locations of objects and compare the represented locations to locations of the objects as determined by the other farming equipment. That is, the represented locations of the same objects determined by other farming equipment is used as represented locations by the farming machine 250.

In some embodiments, the reference location store 350 may store absolute locations of objects. For example, objects such as a building or a lamppost may be associated with known coordinates that are stored as reference locations. The reference locations may also be determined based on data collected by other farming machines 250 operated in the same field. The control system 130 may determine represented locations of the objects based on images captured by the image acquisition system 220 and compare the represented locations to these reference locations. In some embodiments, the reference location store 350 may include reference locations accessed from one or more third-party databases.

In some embodiments, the farming machine 250 may be attached with a mounting mechanism (e.g., trailer, tiller, sprayer, etc) that is towed behind the farming machine 250. The mounting mechanism may be equipped with a GPS receiver that provides location data of the mounting mechanism as the farming machine 250 moves. The location data of the mounting mechanism may be used as reference locations. In some embodiments, the mounting mechanism may be associated with kinematic models, and the kinematic models may be used to determine reference locations.

The reference location store 350 may include a 6-dimensional vector of characteristics (x-coordinate, y-coordinate, z-coordinate, pitch, yaw, roll) indicative of a reference location of one or more known objects. Alternatively, the reference location store 350 may include a subset of characteristics for one or more objects, because depending on the source of the reference location, one or more types of characteristics may be unavailable. For example, the x-coordinate and the z-coordinate of a lamppost may be known, but the height of the lamppost (i.e., y-coordinate) may be unknown.

The comparison module 330 compares a represented location of an object with a reference location of the object. The control system 130 accesses the reference location store 350 that includes known reference locations of objects. The comparison module 330 may perform comparison of reference locations and represented locations of one or more objects. In some embodiments, the number of characteristics in the vector of the represented location and the number of characteristics in the vector of the reference location may be the same. The comparison module 330 may perform one-to-one comparison for each characteristic in the represented location to the corresponding information in the reference location (e.g., compare the x-coordinate of reference location to the x-coordinate of represented location). In other embodiments, the number of dimensions in the vector of the represented location and the number of dimensions in the vector of the reference location may be different. For example, the represented location may include 6-dimensions, and the reference location may only include 4-dimensions. The comparison module 330 may perform a comparison for each of the available types of characteristics, and the control system 130 may perform calibration based on the available types of characteristics.

The camera adjustment module 340 determines characteristics of the cameras in the image acquisition system 220 based on a comparison of reference location of an object and a represented location of the object. The characteristics of a camera may include intrinsic characteristics such as focal length, skew, distortion, and image center and/or extrinsic characteristics such as position of the camera on the farming machine 250 and orientation of the camera (e.g., angle of the camera with respect to direction of travel of the farming machine 250). The camera adjustment module 340 may also determine extrinsic characteristics such as relative positions and angles between two cameras in a stereo camera system.

The camera adjustment module 340 may make digital adjustments on images captured by the image acquisition system or physically modify positions or optical settings of the one or more cameras in the image acquisition system 220. The camera adjustment module 340 may determine robotic transformation values based on the intrinsic and extrinsic characteristics of the cameras and transform the positions or orientations of the cameras to align the represented location with the reference location. For example, the camera adjustment module 340 may change the position of one or more cameras (e.g., shift up/down, left/right) or change the orientation of one or more cameras (e.g., tilt up/down, left right).

In some embodiments, if the comparison of the reference location and the represented location exceeds an error tolerance, the camera adjustment module 340 may not be able to modify the characteristics of the cameras. The camera adjustment module 340 may generate an error message and indicate that one or more cameras of the image acquisition system 220 requires repairs or replacement.

Using the calibrated image acquisition system 220, the farming machine 250 captures images of the field as the farming machine 250 moves through the field. The control system 130 identifies plants in the field from the captured images to be treated. After identifying the plants, the control system actuates the treatment mechanism 254 to treat the identified plants. By using the calibrated image acquisition system 220, the farming machine 250 can treat plants with higher accuracy.

B. Example of Calibrating an Image Acquisition System

Figure 4:
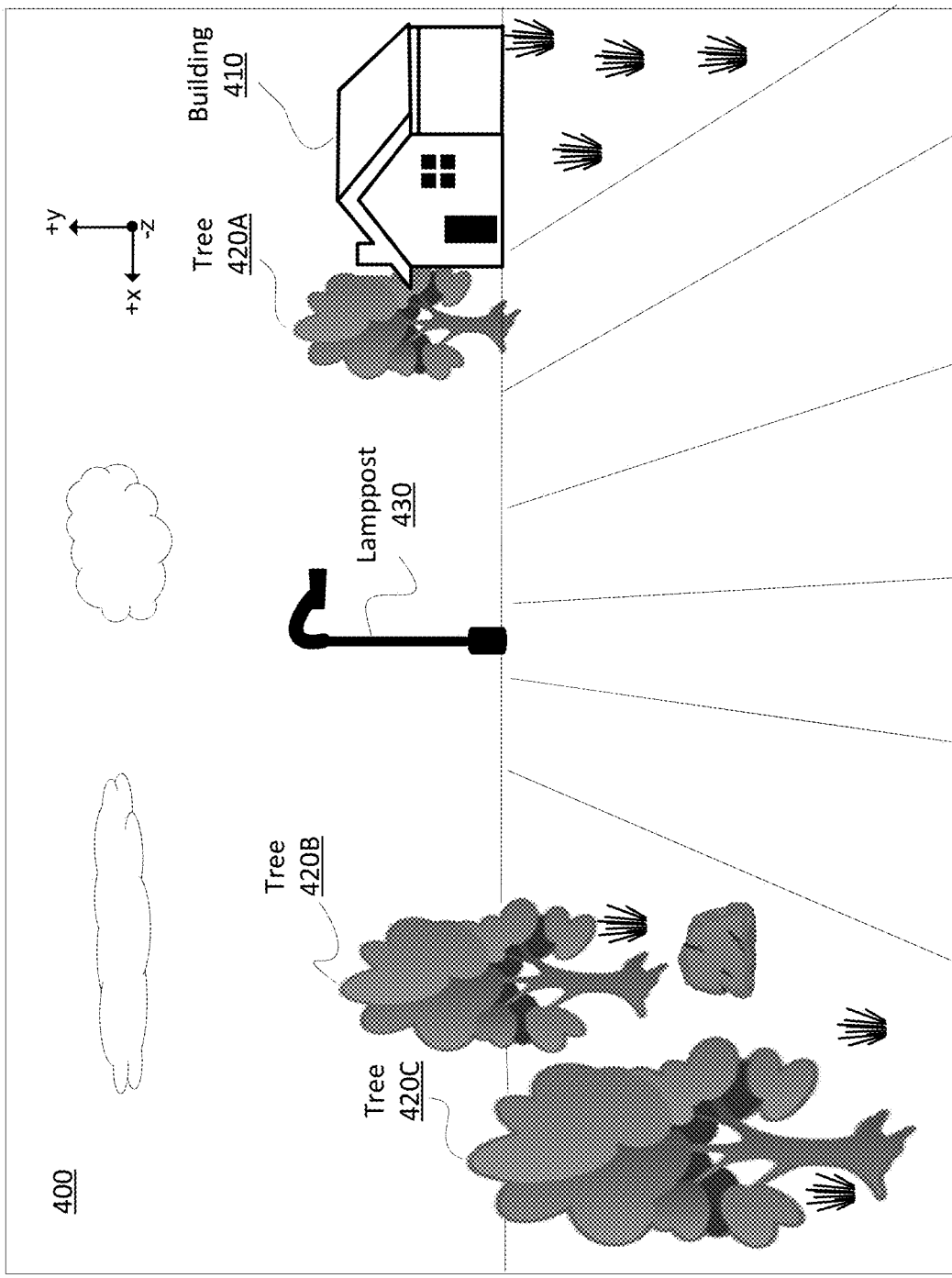
FIG. 4 illustrates an image captured by an image acquisition system of a farming machine, in accordance with an embodiment.

FIG. 4 illustrates an image captured by an image acquisition system of a farming machine, in accordance with an embodiment. The image 400 may illustrates a field of view of a single camera in the image acquisition system 220 or may be an aggregate of fields of view of multiple cameras in the image acquisition system 220. The image 400 includes several objects such as a building 410, trees 420A, 420B, 420C, and a lamppost 430. The image 400 may be accessed by the control system 130 and used to generate a 3-dimensional model of the field in combination with location data from the GPS receiver 230 and the motion data from the IMU 240. To generate the 3-dimensional model, the control system 130 may identify types of objects captured in the image 400 to semantically label the objects and determine pixel locations associated with the object within the objects or identify boundary boxes around the objects. The control system 130 may generate the 3-dimensional model using SLAM in combination with the location data from the GPS receiver 230 and the motion data from the IMU 240. The 3-dimensional model may provide six types of data for each of the identified objects for the represented location of the object: (x,y,z) coordinates of the object and rotation data (pitch, roll, yaw) of the object. The represented location is compared to reference location of the object to calibrate the image acquisition system.

Figure 5:
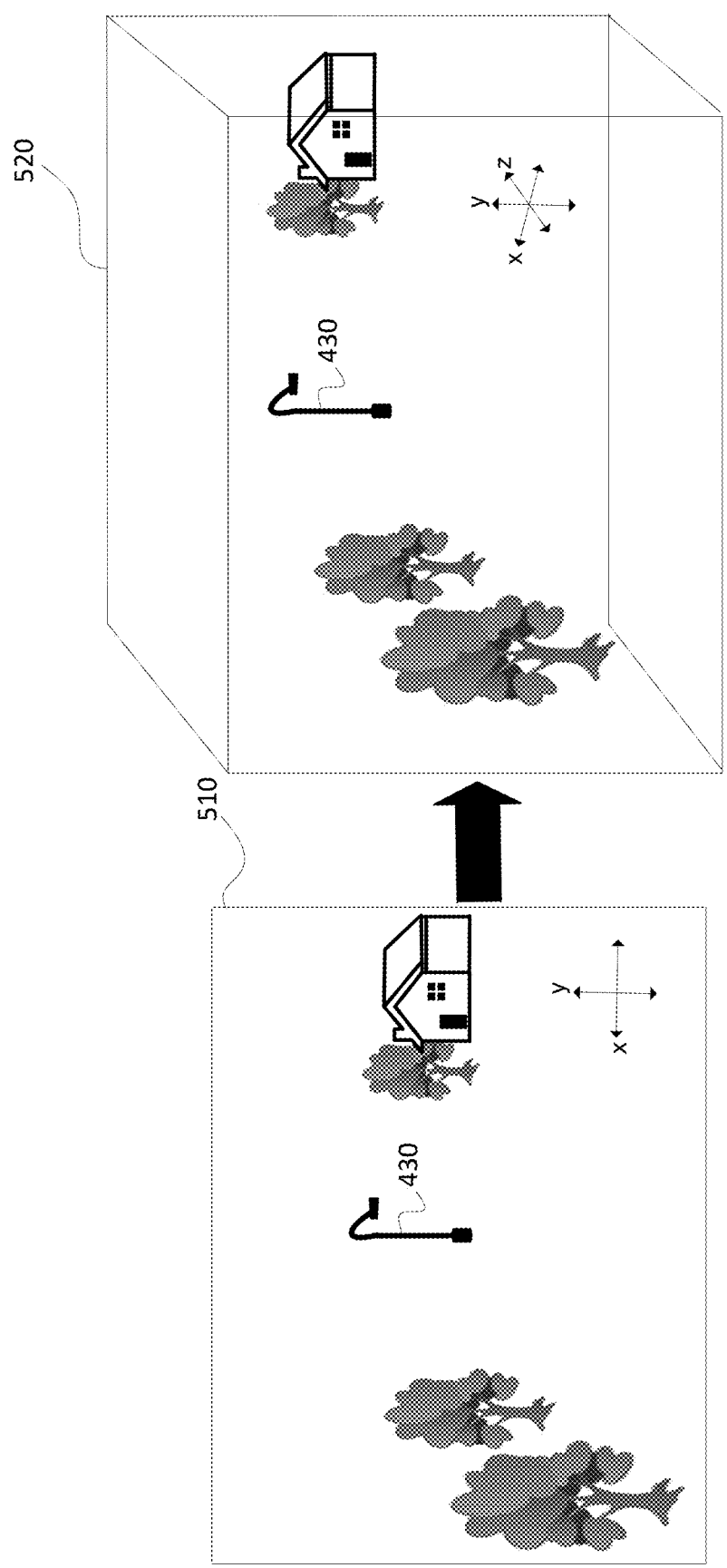
FIG. 5 illustrates a reference model generated based on images captured by an image acquisition system of a farming machine, in accordance with an embodiment.

FIG. 5 illustrates a reference model generated based on images captured by an image acquisition system of a farming machine, in accordance with an embodiment. The image 510 is captured by the image acquisition system 220 as the farming machine 250 travels through the field. The control system 130 accesses the image 510 and generates a 3-dimensional reference model 520 in real-time based on the image 510. Although not illustrated, the reference model 520 may be generated based on additional images captured by the image acquisition system 220. The control system 130 may apply SLAM model to the image 510 in combination with location data from the GPS receiver 230 and the motion data from the IMU 240. The control system 130 determines a reference location of the lamppost 430 based on the reference model 520. The reference location may be a six dimensional vector with (x,y,z) coordinates and rotational data (pitch, roll, yaw).

The image 510 may be captured during a pass through the field to be used for comparison against images captured during future passes through the field. Alternatively, the image 510 may be captured by a first camera to be used in calibration of a second camera different from the first camera. In the example shown in FIGS. 5-7, calibration is performed using the lamppost 430. However, in other examples, calibration may be performed using different and/or additional objects.

Figure 6:
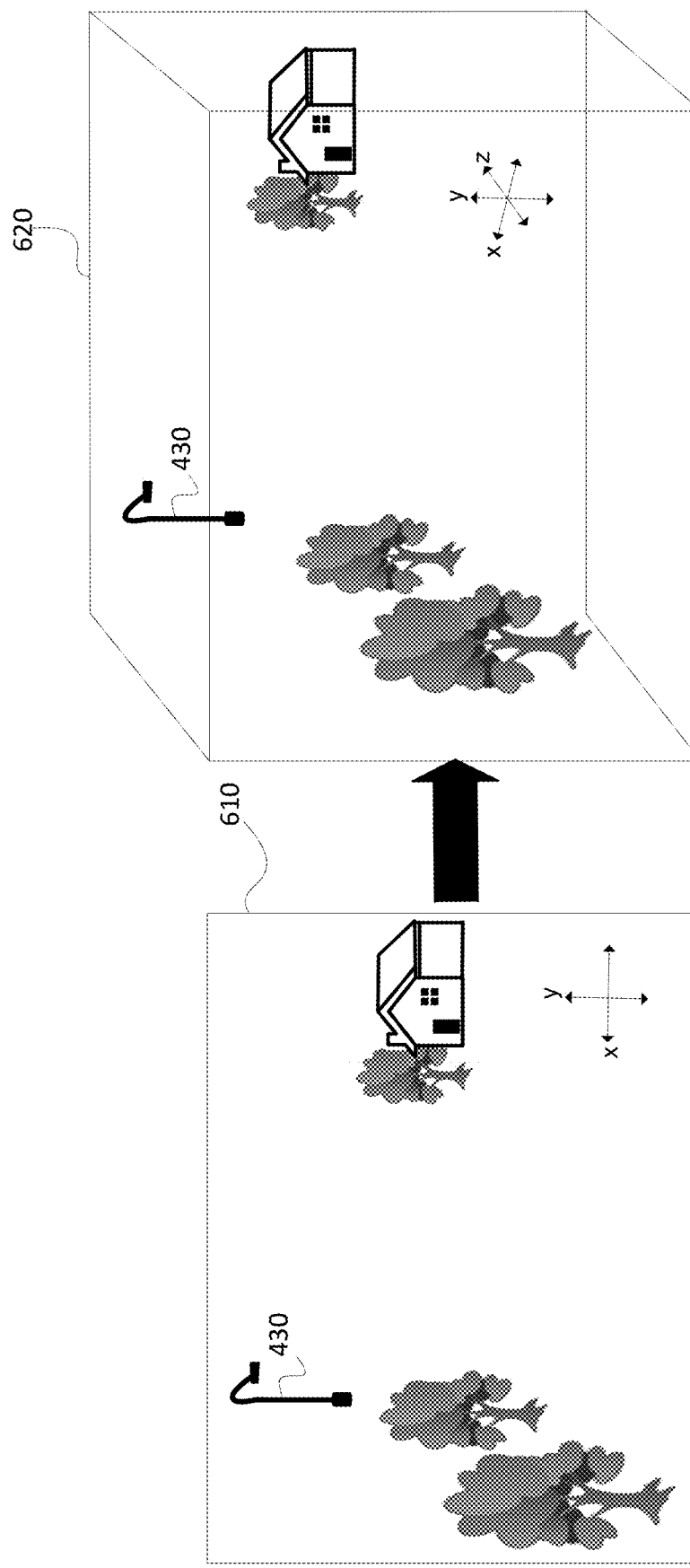
FIG. 6 illustrates a represented model generated based on images captured by an image acquisition system of a farming machine, in accordance with an embodiment.

FIG. 6 illustrates a represented model generated based on images captured by an image acquisition system of a farming machine, in accordance with an embodiment. The image 610 is captured by the image acquisition system 220 as the farming machine 250 travels through the field. The control system 130 generates a 3-dimensional represented model 620 based on the image 610 and/or additional images captured by the image acquisition system 220. The control system 130 generates the represented model 620 by applying a SLAM model to the image 610 and location data from the GPS receiver 230 and the motion data from the IMU 240 collected at a time at which the image 610 was captured. The control system 130 determines a represented location of the lamppost based on the represented model 520, the represented location including a six dimensional vector with (x,y,z) coordinates and rotational data (pitch, roll, yaw).

Figure 7:
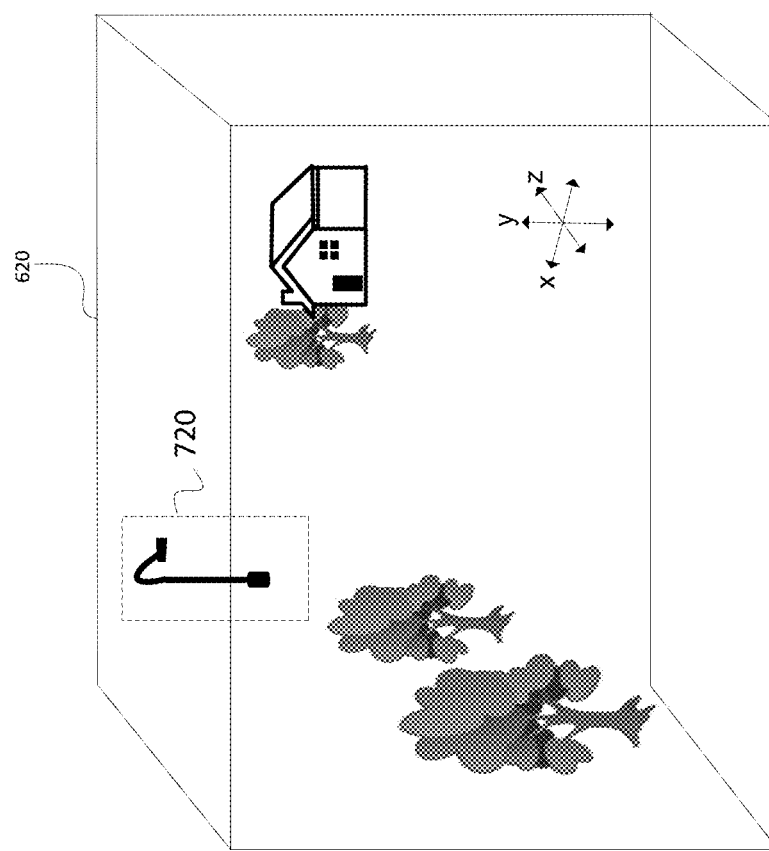
FIG. 7 illustrates a comparison of a represented model and a reference model, in accordance with an embodiment.
Figure 7:
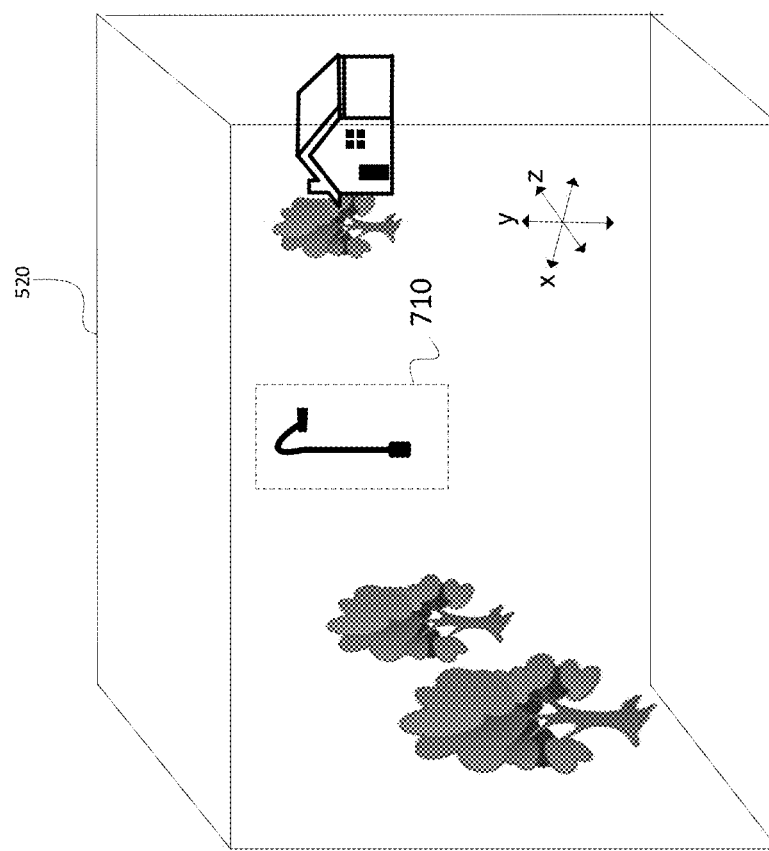

FIG. 7 illustrates a comparison of a represented model and a reference model, in accordance with an embodiment. The control system 130 determines a reference location 710 from the reference model 520 associated with the lamppost 430 and the represented location 720 from the represented model 620 associated with the lamppost 430. As shown in FIG. 7, the reference location 710 and the represented location 720 of the lamppost 430 are not aligned with each other. When the reference location 710 and the represented location 720 differ by more than a threshold, the control system 130 is configured to adjust the cameras in the image acquisition system 220 to align the represented location 720 with the reference location 710.

C. Method of Calibrating an Image Acquisition System

Figure 8:
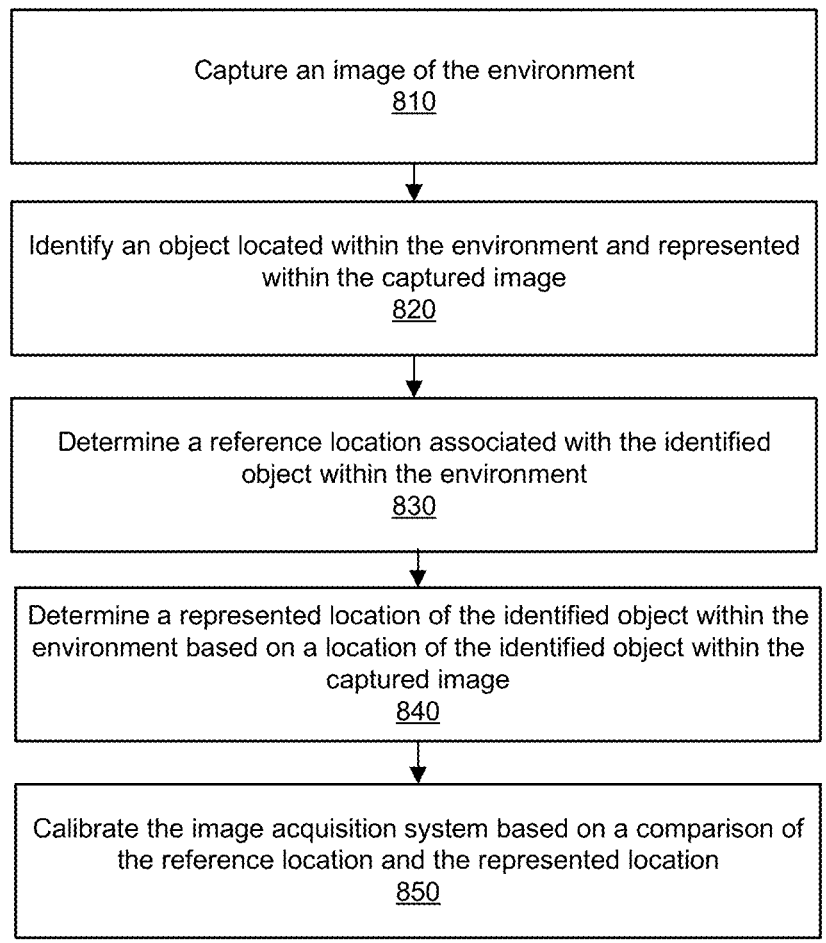
FIG. 8 is a flowchart illustrating a method of calibrating an image acquisition system of a farming machine, in accordance with an embodiment.

FIG. 8 is a flowchart illustrating a method of calibrating an image acquisition system of a farming machine, in accordance with an embodiment. The steps of FIG. 8 are illustrated from the perspective of a system (e.g., control system 130) with a hardware processor performing the method 800. However, some or all of the steps may be performed by other systems or components. In addition, in some embodiments, the steps may be performed in parallel, in different orders, or asynchronously, and in other embodiments, different steps altogether may be performed.

During calibration, a farming machine travels through an environment to collect image data of the environment and collect motion data and location data of the farming machine that is synchronized with the image data. The system captures 810 an image of the environment as the farming machine is travelling. The system identifies 820 an object located within the environment and represented within the captured image. The system determines 830 a reference location associated with the identified object within the environment based on the 3D model. In one example, the reference location may be a previously determined location based on image data, motion data, and location data collected in the past (e.g., during a previous pass through the environment). In another example, the reference location may be determined in real-time during calibration using images captured by a reference camera different from a camera that is being calibrated. The system determines 840 a represented location of the identified object within the environment based on a location of the identified object within the captured image. To determine the represented location, the system may use image segmentation methods to identify the type of object and pixel locations or a boundary box associated with the object and label the image with the information. Based on the labelled image, the system generates a 3D model of the environment by mapping the motion data and the location data onto pixels in the labelled image. The system calibrates 850 the image acquisition system based on a comparison of the reference location and the represented location. Based on the comparison, the system can make adjustments to cameras in the image acquisition system to make the represented location align with the reference location.

D. Control System

Figure 9:
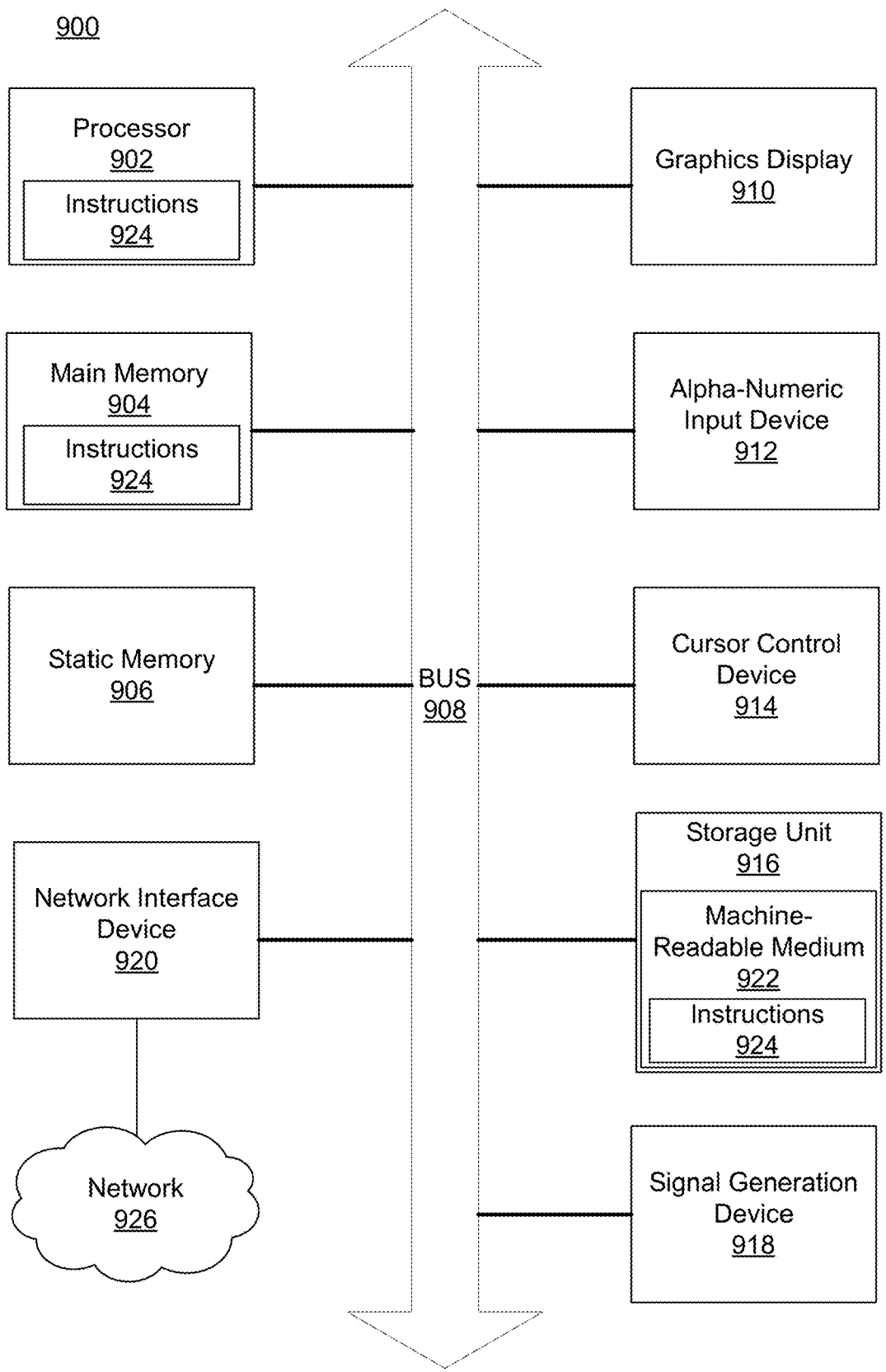
FIG. 9 is a schematic illustrating a control system, in accordance with an embodiment.

FIG. 9 is a block diagram illustrating components of an example machine for reading and executing instructions from a machine-readable medium. Specifically, FIG. 9 shows a diagrammatic representation of control system 130 in the example form of a computer system 900. The computer system 900 can be used to execute instructions 924 (e.g., program code or software) for causing the machine to perform any one or more of the methodologies (or processes) described herein. In alternative embodiments, the machine operates as a standalone device or a connected (e.g., networked) device that connects to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a smartphone, an internet of things (IoT) appliance, a network router, switch or bridge, or any machine capable of executing instructions 924 (sequential or otherwise) that specify actions to be taken by that machine. Further, while only a single machine is illustrated, the term "machine" shall also be taken to include any collection of machines that individually or jointly execute instructions 924 to perform any one or more of the methodologies discussed herein.

The example computer system 900 includes one or more processing units (generally processor 902). The processor 902 is, for example, a central processing unit (CPU), a graphics processing unit (GPU), a digital signal processor (DSP), a controller, a state machine, one or more application specific integrated circuits (ASICs), one or more radio-frequency integrated circuits (RFICs), or any combination of these. The computer system 900 also includes a main memory 904. The computer system may include a storage unit 916. The processor 902, memory 904, and the storage unit 916 communicate via a bus 908.

In addition, the computer system 900 can include a static memory 906, a graphics display 910 (e.g., to drive a plasma display panel (PDP), a liquid crystal display (LCD), or a projector). The computer system 900 may also include alphanumeric input device 912 (e.g., a keyboard), a cursor control device 914 (e.g., a mouse, a trackball, a joystick, a motion sensor, or other pointing instrument), a signal generation device 918 (e.g., a speaker), and a network interface device 920, which also are configured to communicate via the bus 908.

The storage unit 916 includes a machine-readable medium 922 on which is stored instructions 924 (e.g., software) embodying any one or more of the methodologies or functions described herein. For example, the instructions 924 may include the functionalities of modules of the system 130 described in FIG. 2. The instructions 924 may also reside, completely or at least partially, within the main memory 904 or within the processor 902 (e.g., within a processor's cache memory) during execution thereof by the computer system 900, the main memory 904 and the processor 902 also constituting machine-readable media. The instructions 924 may be transmitted or received over a network 926 via the network interface device 920.

The control system 130 can comprise a processing unit (e.g., one or more of a CPU, a GPU, or an FPGA) and a data storage medium (e.g., static or dynamic memory). In one embodiment, the control system 130 comprises a deep-learning GPU that is configured to effectively execute a deep-learning neural network. For example, the computer system 900 may include an NVIDIA GeForce® GTX™ TITAN X using the Caffe deep learning framework, the Jetson Xavier, or the NVIDIA Tx1 or Tx2 using the Tensorflow deep learning framework. Furthermore, image data passed in to the computer instructions may be transmitted to the control system 130 for processing using any type of transmission protocol. For example, the open systems interconnect (OSI) model may be used to send image data from the image acquisition system 220 to the control system 130 using ethernet connections between these components.

What is claimed is:

1. A farming machine comprising:
   an image acquisition system configured to capture images of an environment as the farming machine moves through the environment; and
   a control system including a processor, the processor configured to:
      capture, using the image acquisition system operating in a current configuration, a set of images of the environment as the farming machine moves through a field on a current pass treating one or more individual plants;
      identify an object located within the environment on the current pass and represented within the set of images;
      determine a reference location of the identified object within the environment, wherein:
         the reference location is a known location associated with the identified object within the environment, and
         the reference location is determined from a previous set of images of the environment captured by the image acquisition system as the farming machine travels through the field on a previous pass treating one or more individual plants;
      determine a represented location of the identified object within the environment based on a location of the identified object within the set of images;
      calibrate, while the farming machine is travelling through the field on the current pass, the image acquisition system based on a comparison of the reference location and the represented location such that it operates in a calibrated configuration;
      treat, on the current pass, a plant identified in an image captured by the image acquisition system operating in the calibrated configuration.

2. The farming machine of claim 1, wherein the previous set of images is associated with motion data and location data and determining the reference location of the identified object within the environment further comprises:
- identifying the object in the previous set of images;
- generating a reference three-dimensional (3D) model representing objects in the environment based on the previous set of images, the motion data, and the location data; and
- determining the reference location of the identified object based on a location of the identified object within the reference 3D model.

3. The farming machine of claim 2, wherein determining the represented location of the identified object within the environment further comprises:
- generating a represented three-dimensional (3D) model representing the objects in the environment based on the set of images and motion data and location data associated with the set of images; and
- determining the represented location of the identified object based on a location of the identified object within the represented 3D model.

4. The farming machine of claim 3, wherein at least one of the reference location and the represented location is represented by a six dimensional vector including three dimensional location coordinates and three dimensional rotational data.

5. The farming machine of claim 2, wherein the set of images used to determine the represented location is captured by a first camera of the image acquisition system and the previous set of images used to determine the reference location is captured by a second camera of the image acquisition system different from the first camera.

6. The farming machine of claim 5, wherein a first field of view of the first camera is narrower than a second field of view of the second camera, the second field of view including the first field of view.

7. The farming machine of claim 1, wherein calibrating the image acquisition system includes adjusting a position or an orientation of the image acquisition system based on the comparison of the reference location and the represented location.

8. The farming machine of claim 1, wherein calibrating the image acquisition system includes making digital adjustments on images captured by the image acquisition system based on the comparison of the reference location and the represented location.

9. The farming machine of claim 1, wherein the identified object is a stationary object at a fixed location within the environment.

10. A method comprising:
- accessing, from a farming machine as the farming machine moves through a field on a current pass treating one or more individual plants, a set of images of an environment captured by an image acquisition system operating in a current configuration;
- identifying an object located within the environment on the current pass and represented within the captured set of images;
- determining a reference location of the identified object within the environment, wherein:
  - the reference location is a known location associated with the identified object within the environment, and
  - the reference location is determined from a previous set of images of the environment captured by the image acquisition system as the farming machine travels through the field on a previous pass treating one or more individual plants;
- determining a represented location of the identified object within the environment based on a location of the identified object within the set of images;
- calibrating, while the farming machine is travelling through the field on the current pass, the image acquisition system based on a comparison of the reference location and the represented location such that it operates in a calibrated configuration; and
- treating, on the current pass, a plant identified in an image captured by the image acquisition system operating in the calibrated configuration.

11. The method of claim 10, wherein the previous set of images is associated with motion data and location data and determining the reference location of the identified object within the environment further comprises:
- identifying the object in the previous set of images;
- generating a reference three-dimensional (3D) model representing objects in the environment based on the previous set of images, the motion data, and the location data; and
- determining the reference location of the identified object based on a location of the identified object within the reference 3D model.

12. The method of claim 11, wherein determining the represented location of the identified object within the environment further comprises:
- generating a represented three-dimensional (3D) model representing the objects in the environment based on the set of images and motion data and location data associated with the set of images; and
- determining the represented location of the identified object based on a location of the identified object within the represented 3D model.

13. The method of claim 12, wherein at least one of the reference location and the represented location is represented by a six dimensional vector including three dimensional location coordinates and three dimensional rotational data.

14. The method of claim 11, wherein the set of images used to determine the represented location is captured by a first camera of the image acquisition system and the previous set of images used to determine the reference location is captured by a second camera of the image acquisition system different from the first camera.

15. The method of claim 10, wherein calibrating the image acquisition system includes adjusting a position or an orientation of the image acquisition system based on the comparison of the reference location and the represented location.

16. A non-transitory computer-readable medium comprising computer program instructions that, when executed by a computer processor, cause the processor to perform operations, the instructions comprising instructions to:
- accessing, from a farming machine as the farming machine moves through a field on a current pass treating one or more individual plants, a set of images of an environment captured by an image acquisition system operating in a current configuration;
- identifying an object located within the environment on the current pass and represented within the captured set of images;
- determining a reference location of the identified object within the environment, wherein:
  - the reference location is a known location associated with the identified object within the environment, and the reference location is determined from a previous set of images of the environment captured by the image acquisition system as the farming machine travels through the field on a previous pass treating one or more individual plants;

determining a represented location of the identified object within the environment based on a location of the identified object within the set of images;

calibrating, while the farming machine is travelling through the field on the current pass, the image acquisition system based on a comparison of the reference location and the represented location such that it operates in a calibrated configuration; and treating, on the current pass, a plant identified in an image captured by the image acquisition system operating in the calibrated configuration.

* * * * *